(12) United States Patent
Igahara et al.

(10) Patent No.: US 11,194,656 B2
(45) Date of Patent: Dec. 7, 2021

(54) MEMORY SYSTEM

(71) Applicant: KIOXIA CORPORATION, Tokyo (JP)

(72) Inventors: Shunichi Igahara, Kamakura Kanagawa (JP); Yoshihisa Kojima, Kawasaki Kanagawa (JP); Takehiko Amaki, Yokohama Kanagawa (JP); Suguru Nishikawa, Osaka Osaka (JP)

(73) Assignee: KIOXIA CORPORATION, Tokyo (JP)

( * ) Notice: Subject to any disclaimer, the term of this patent is extended or adjusted under 35 U.S.C. 154(b) by 18 days.

(21) Appl. No.: 16/774,609

(22) Filed: Jan. 28, 2020

(65) Prior Publication Data

US 2020/0387425 A1 Dec. 10, 2020

(30) Foreign Application Priority Data

Jun. 4, 2019 (JP) .............................. JP2019-104682

(51) Int. Cl.
*G06F 11/10* (2006.01)
*G06F 3/06* (2006.01)

(52) U.S. Cl.
CPC ........ *G06F 11/1068* (2013.01); *G06F 3/0679* (2013.01); *G06F 11/1044* (2013.01); *G06F 11/1056* (2013.01)

(58) Field of Classification Search
CPC .................................................. G06F 11/1068
USPC .......................... 714/764, 766, 762, 763, 769
See application file for complete search history.

(56) References Cited

U.S. PATENT DOCUMENTS

| | | | |
|---|---|---|---|
| 9,071,239 B2* | 6/2015 | Jung ..................... | G11C 7/1006 |
| 2009/0180337 A1* | 7/2009 | Nakanishi ............ | G11C 7/1069 |
| | | | 365/189.08 |
| 2014/0169092 A1 | 6/2014 | Miyamoto et al. | |
| 2016/0299813 A1* | 10/2016 | Seol ....................... | G06F 3/0679 |
| 2016/0322990 A1 | 11/2016 | Tuers et al. | |
| 2019/0188078 A1* | 6/2019 | Yu ......................... | G06F 11/1076 |
| 2020/0028709 A1* | 1/2020 | Kim ......................... | H04L 47/34 |

FOREIGN PATENT DOCUMENTS

JP 2014-137834 A 7/2014

* cited by examiner

*Primary Examiner* — Fritz Alphonse
(74) *Attorney, Agent, or Firm* — Kim & Stewart LLP

(57) ABSTRACT

A memory system includes a non-volatile memory and a controller that includes a toggle encoder configured to encode first data having a first bit length and a first number of toggles, into second data having a second bit length longer than the first bit length and a second number of toggles smaller than the first number of toggles, and transmit the second data to the non-volatile memory. The memory system may further include a toggle decoder configured to decode third data received from the non-volatile memory into fourth data, the third data having the second bit length and the second number of toggles and the fourth data having the first bit length and the first number of toggles.

20 Claims, 25 Drawing Sheets

*FIG. 4*

| FIRST DATA (4 bit) | NUMBER OF TOGGLES | SECOND DATA (5 bit) | NUMBER OF TOGGLES |
|---|---|---|---|
| 0000 | 0 | 00000 | 0 |
| 1111 | 0 | 11111 | 0 |
| 1000 | 1 | 10000 | 1 |
| 0001 | 1 | 00001 | 1 |
| 1100 | 1 | 00011 | 1 |
| 0011 | 1 | 11000 | 1 |
| 0111 | 1 | 11100 | 1 |
| 1110 | 1 | 00111 | 1 |
| 0100 | 2 | 11110 | 1 |
| 0010 | 2 | 01111 | 1 |
| 0110 | 2 | 01000 | 2 |
| 1001 | 2 | 00100 | 2 |
| 1011 | 2 | 00010 | 2 |
| 1101 | 2 | 01100 | 2 |
| 1010 | 3 | 00110 | 2 |
| 0101 | 3 | 10001 | 2 |
| - | - | 10011 | 2 |
| - | - | 11001 | 2 |
| - | - | 01110 | 2 |
| - | - | 11101 | 2 |
| - | - | 11011 | 2 |
| - | - | 10111 | 2 |
| - | - | 00101 | 3 |
| - | - | 01001 | 3 |
| - | - | 10100 | 3 |
| - | - | 10010 | 3 |
| - | - | 11010 | 3 |
| - | - | 10110 | 3 |
| - | - | 01011 | 3 |
| - | - | 01101 | 3 |
| - | - | 01010 | 4 |
| - | - | 10101 | 4 |

A — (rows 0001 through 0011)
B — (rows 0111 through 0010)
C — (rows 1010, 0101)

FIG. 5A

| FIRST DATA (9 bit) | SECOND DATA (10 bit) | FIRST DATA (9 bit) | SECOND DATA (10 bit) |
|---|---|---|---|
| 0 | 0000000000 | 32 | 0000100001 |
| 1 | 0000000001 | 33 | 0000100010 |
| 2 | 0000000010 | 34 | 0000100011 |
| 3 | 0000000011 | 35 | 0000100100 |
| 4 | 0000000100 | 36 | 0000100110 |
| 5 | 0000000101 | 37 | 0000100111 |
| 6 | 0000000110 | 38 | 0000101000 |
| 7 | 0000000111 | 39 | 0000101100 |
| 8 | 0000001000 | 40 | 0000101110 |
| 9 | 0000001001 | 41 | 0000101111 |
| 10 | 0000001010 | 42 | 0000110000 |
| 11 | 0000001011 | 43 | 0000110001 |
| 12 | 0000001100 | 44 | 0000110010 |
| 13 | 0000001101 | 45 | 0000110011 |
| 14 | 0000001110 | 46 | 0000110100 |
| 15 | 0000001111 | 47 | 0000110110 |
| 16 | 0000010000 | 48 | 0000110111 |
| 17 | 0000010001 | 49 | 0000111000 |
| 18 | 0000010010 | 50 | 0000111001 |
| 19 | 0000010011 | 51 | 0000111010 |
| 20 | 0000010100 | 52 | 0000111011 |
| 21 | 0000010110 | 53 | 0000111100 |
| 22 | 0000010111 | 54 | 0000111101 |
| 23 | 0000011000 | 55 | 0000111110 |
| 24 | 0000011001 | 56 | 0000111111 |
| 25 | 0000011010 | 57 | 0001000000 |
| 26 | 0000011011 | 58 | 0001000001 |
| 27 | 0000011100 | 59 | 0001000010 |
| 28 | 0000011101 | 60 | 0001000011 |
| 29 | 0000011110 | 61 | 0001000100 |
| 30 | 0000011111 | 62 | 0001000110 |
| 31 | 0000100000 | 63 | 0001000111 |

FIG. 5B

| FIRST DATA (9 bit) | SECOND DATA (10 bit) | FIRST DATA (9 bit) | SECOND DATA (10 bit) |
|---|---|---|---|
| 64 | 0001001000 | 96 | 0001111101 |
| 65 | 0001001100 | 97 | 0001111110 |
| 66 | 0001001110 | 98 | 0001111111 |
| 67 | 0001001111 | 99 | 0010000000 |
| 68 | 0001010000 | 100 | 0010000001 |
| 69 | 0001011000 | 101 | 0010000010 |
| 70 | 0001011100 | 102 | 0010000011 |
| 71 | 0001011110 | 103 | 0010000100 |
| 72 | 0001011111 | 104 | 0010000110 |
| 73 | 0001100000 | 105 | 0010000111 |
| 74 | 0001100001 | 106 | 0010001000 |
| 75 | 0001100010 | 107 | 0010001100 |
| 76 | 0001100011 | 108 | 0010001110 |
| 77 | 0001100100 | 109 | 0010001111 |
| 78 | 0001100110 | 110 | 0010010000 |
| 79 | 0001100111 | 111 | 0010011000 |
| 80 | 0001101000 | 112 | 0010011100 |
| 81 | 0001101100 | 113 | 0010011110 |
| 82 | 0001101110 | 114 | 0010011111 |
| 83 | 0001101111 | 115 | 0010100000 |
| 84 | 0001110000 | 116 | 0010110000 |
| 85 | 0001110001 | 117 | 0010111000 |
| 86 | 0001110010 | 118 | 0010111100 |
| 87 | 0001110011 | 119 | 0010111110 |
| 88 | 0001110100 | 120 | 0010111111 |
| 89 | 0001110110 | 121 | 0011000000 |
| 90 | 0001110111 | 122 | 0011000001 |
| 91 | 0001111000 | 123 | 0011000010 |
| 92 | 0001111001 | 124 | 0011000011 |
| 93 | 0001111010 | 125 | 0011000100 |
| 94 | 0001111011 | 126 | 0011000110 |
| 95 | 0001111100 | 127 | 0011000111 |

FIG. 5C

| FIRST DATA (9 bit) | SECOND DATA (10 bit) | FIRST DATA (9 bit) | SECOND DATA (10 bit) |
|---|---|---|---|
| 128 | 0011001000 | 160 | 0011111101 |
| 129 | 0011001100 | 161 | 0011111110 |
| 130 | 0011001110 | 162 | 0011111111 |
| 131 | 0011001111 | 163 | 0100000000 |
| 132 | 0011010000 | 164 | 0100000001 |
| 133 | 0011011000 | 165 | 0100000010 |
| 134 | 0011011100 | 166 | 0100000011 |
| 135 | 0011011110 | 167 | 0100000100 |
| 136 | 0011011111 | 168 | 0100000110 |
| 137 | 0011100000 | 169 | 0100000111 |
| 138 | 0011100001 | 170 | 0100001000 |
| 139 | 0011100010 | 171 | 0100001100 |
| 140 | 0011100011 | 172 | 0100001110 |
| 141 | 0011100100 | 173 | 0100001111 |
| 142 | 0011100110 | 174 | 0100010000 |
| 143 | 0011100111 | 175 | 0100011000 |
| 144 | 0011101000 | 176 | 0100011100 |
| 145 | 0011101100 | 177 | 0100011110 |
| 146 | 0011101110 | 178 | 0100011111 |
| 147 | 0011101111 | 179 | 0100100000 |
| 148 | 0011110000 | 180 | 0100110000 |
| 149 | 0011110001 | 181 | 0100111000 |
| 150 | 0011110010 | 182 | 0100111100 |
| 151 | 0011110011 | 183 | 0100111110 |
| 152 | 0011110100 | 184 | 0100111111 |
| 153 | 0011110110 | 185 | 0101000000 |
| 154 | 0011110111 | 186 | 0101100000 |
| 155 | 0011111000 | 187 | 0101110000 |
| 156 | 0011111001 | 188 | 0101111000 |
| 157 | 0011111010 | 189 | 0101111100 |
| 158 | 0011111011 | 190 | 0101111110 |
| 159 | 0011111100 | 191 | 0101111111 |

FIG. 5D

| FIRST DATA (9 bit) | SECOND DATA (10 bit) | FIRST DATA (9 bit) | SECOND DATA (10 bit) |
|---|---|---|---|
| 192 | 0110000000 | 224 | 0111001111 |
| 193 | 0110000001 | 225 | 0111010000 |
| 194 | 0110000010 | 226 | 0111011000 |
| 195 | 0110000011 | 227 | 0111011100 |
| 196 | 0110000100 | 228 | 0111011110 |
| 197 | 0110000110 | 229 | 0111011111 |
| 198 | 0110000111 | 230 | 0111100000 |
| 199 | 0110001000 | 231 | 0111100001 |
| 200 | 0110001100 | 232 | 0111100010 |
| 201 | 0110001110 | 233 | 0111100011 |
| 202 | 0110001111 | 234 | 0111100100 |
| 203 | 0110010000 | 235 | 0111100110 |
| 204 | 0110011000 | 236 | 0111100111 |
| 205 | 0110011100 | 237 | 0111101000 |
| 206 | 0110011110 | 238 | 0111101100 |
| 207 | 0110011111 | 239 | 0111101110 |
| 208 | 0110100000 | 240 | 0111101111 |
| 209 | 0110110000 | 241 | 0111110000 |
| 210 | 0110111000 | 242 | 0111110001 |
| 211 | 0110111100 | 243 | 0111110010 |
| 212 | 0110111110 | 244 | 0111110011 |
| 213 | 0110111111 | 245 | 0111110100 |
| 214 | 0111000000 | 246 | 0111110110 |
| 215 | 0111000001 | 247 | 0111110111 |
| 216 | 0111000010 | 248 | 0111111000 |
| 217 | 0111000011 | 249 | 0111111001 |
| 218 | 0111000100 | 250 | 0111111010 |
| 219 | 0111000110 | 251 | 0111111011 |
| 220 | 0111000111 | 252 | 0111111100 |
| 221 | 0111001000 | 253 | 0111111101 |
| 222 | 0111001100 | 254 | 0111111110 |
| 223 | 0111001110 | 255 | 0111111111 |

FIG. 5E

| FIRST DATA (9 bit) | SECOND DATA (10 bit) | FIRST DATA (9 bit) | SECOND DATA (10 bit) |
|---|---|---|---|
| 256 | 1000000000 | 288 | 1000110001 |
| 257 | 1000000001 | 289 | 1000110011 |
| 258 | 1000000010 | 290 | 1000110111 |
| 259 | 1000000011 | 291 | 1000111000 |
| 260 | 1000000100 | 292 | 1000111001 |
| 261 | 1000000101 | 293 | 1000111011 |
| 262 | 1000000110 | 294 | 1000111100 |
| 263 | 1000000111 | 295 | 1000111101 |
| 264 | 1000001000 | 296 | 1000111110 |
| 265 | 1000001001 | 297 | 1000111111 |
| 266 | 1000001011 | 298 | 1001000000 |
| 267 | 1000001100 | 299 | 1001000001 |
| 268 | 1000001101 | 300 | 1001000011 |
| 269 | 1000001110 | 301 | 1001000111 |
| 270 | 1000001111 | 302 | 1001001111 |
| 271 | 1000010000 | 303 | 1001011111 |
| 272 | 1000010001 | 304 | 1001100000 |
| 273 | 1000010011 | 305 | 1001100001 |
| 274 | 1000010111 | 306 | 1001100011 |
| 275 | 1000011000 | 307 | 1001100111 |
| 276 | 1000011001 | 308 | 1001101111 |
| 277 | 1000011011 | 309 | 1001110000 |
| 278 | 1000011100 | 310 | 1001110001 |
| 279 | 1000011101 | 311 | 1001110011 |
| 280 | 1000011110 | 312 | 1001110111 |
| 281 | 1000011111 | 313 | 1001111000 |
| 282 | 1000100000 | 314 | 1001111001 |
| 283 | 1000100001 | 315 | 1001111011 |
| 284 | 1000100011 | 316 | 1001111100 |
| 285 | 1000100111 | 317 | 1001111101 |
| 286 | 1000101111 | 318 | 1001111110 |
| 287 | 1000110000 | 319 | 1001111111 |

FIG. 5F

| FIRST DATA (9 bit) | SECOND DATA (10 bit) | FIRST DATA (9 bit) | SECOND DATA (10 bit) |
|---|---|---|---|
| 320 | 1010000000 | 352 | 1100000011 |
| 321 | 1010000001 | 353 | 1100000100 |
| 322 | 1010000011 | 354 | 1100000101 |
| 323 | 1010000111 | 355 | 1100000110 |
| 324 | 1010001111 | 356 | 1100000111 |
| 325 | 1010011111 | 357 | 1100001000 |
| 326 | 1010111111 | 358 | 1100001001 |
| 327 | 1011000000 | 359 | 1100001011 |
| 328 | 1011000001 | 360 | 1100001100 |
| 329 | 1011000011 | 361 | 1100001101 |
| 330 | 1011000111 | 362 | 1100001110 |
| 331 | 1011001111 | 363 | 1100001111 |
| 332 | 1011011111 | 364 | 1100010000 |
| 333 | 1011100000 | 365 | 1100010001 |
| 334 | 1011100001 | 366 | 1100010011 |
| 335 | 1011100011 | 367 | 1100010111 |
| 336 | 1011100111 | 368 | 1100011000 |
| 337 | 1011101111 | 369 | 1100011001 |
| 338 | 1011110000 | 370 | 1100011011 |
| 339 | 1011110001 | 371 | 1100011100 |
| 340 | 1011110011 | 372 | 1100011101 |
| 341 | 1011110111 | 373 | 1100011110 |
| 342 | 1011111000 | 374 | 1100011111 |
| 343 | 1011111001 | 375 | 1100100000 |
| 344 | 1011111011 | 376 | 1100100001 |
| 345 | 1011111100 | 377 | 1100100011 |
| 346 | 1011111101 | 378 | 1100100111 |
| 347 | 1011111110 | 379 | 1100101111 |
| 348 | 1011111111 | 380 | 1100110000 |
| 349 | 1100000000 | 381 | 1100110001 |
| 350 | 1100000001 | 382 | 1100110011 |
| 351 | 1100000010 | 383 | 1100110111 |

FIG. 5G

| FIRST DATA (9 bit) | SECOND DATA (10 bit) | FIRST DATA (9 bit) | SECOND DATA (10 bit) |
|---|---|---|---|
| 384 | 1100111000 | 416 | 1110000011 |
| 385 | 1100111001 | 417 | 1110000100 |
| 386 | 1100111011 | 418 | 1110000101 |
| 387 | 1100111100 | 419 | 1110000110 |
| 388 | 1100111101 | 420 | 1110000111 |
| 389 | 1100111110 | 421 | 1110001000 |
| 390 | 1100111111 | 422 | 1110001001 |
| 391 | 1101000000 | 423 | 1110001011 |
| 392 | 1101000001 | 424 | 1110001100 |
| 393 | 1101000011 | 425 | 1110001101 |
| 394 | 1101000111 | 426 | 1110001110 |
| 395 | 1101001111 | 427 | 1110001111 |
| 396 | 1101011111 | 428 | 1110010000 |
| 397 | 1101100000 | 429 | 1110010001 |
| 398 | 1101100001 | 430 | 1110010011 |
| 399 | 1101100011 | 431 | 1110010111 |
| 400 | 1101100111 | 432 | 1110011000 |
| 401 | 1101101111 | 433 | 1110011001 |
| 402 | 1101110000 | 434 | 1110011011 |
| 403 | 1101110001 | 435 | 1110011100 |
| 404 | 1101110011 | 436 | 1110011101 |
| 405 | 1101110111 | 437 | 1110011110 |
| 406 | 1101111000 | 438 | 1110011111 |
| 407 | 1101111001 | 439 | 1110100000 |
| 408 | 1101111011 | 440 | 1110100001 |
| 409 | 1101111100 | 441 | 1110100011 |
| 410 | 1101111101 | 442 | 1110100111 |
| 411 | 1101111110 | 443 | 1110101111 |
| 412 | 1101111111 | 444 | 1110110000 |
| 413 | 1110000000 | 445 | 1110110001 |
| 414 | 1110000001 | 446 | 1110110011 |
| 415 | 1110000010 | 447 | 1110110111 |

FIG. 5H

| FIRST DATA (9 bit) | SECOND DATA (10 bit) | FIRST DATA (9 bit) | SECOND DATA (10 bit) |
|---|---|---|---|
| 448 | 1110111000 | 480 | 1111011111 |
| 449 | 1110111001 | 481 | 1111100000 |
| 450 | 1110111011 | 482 | 1111100001 |
| 451 | 1110111100 | 483 | 1111100010 |
| 452 | 1110111101 | 484 | 1111100011 |
| 453 | 1110111110 | 485 | 1111100100 |
| 454 | 1110111111 | 486 | 1111100101 |
| 455 | 1111000000 | 487 | 1111100110 |
| 456 | 1111000001 | 488 | 1111100111 |
| 457 | 1111000010 | 489 | 1111101000 |
| 458 | 1111000011 | 490 | 1111101001 |
| 459 | 1111000100 | 491 | 1111101011 |
| 460 | 1111000101 | 492 | 1111101100 |
| 461 | 1111000110 | 493 | 1111101101 |
| 462 | 1111000111 | 494 | 1111101110 |
| 463 | 1111001000 | 495 | 1111101111 |
| 464 | 1111001001 | 496 | 1111110000 |
| 465 | 1111001011 | 497 | 1111110001 |
| 466 | 1111001100 | 498 | 1111110010 |
| 467 | 1111001101 | 499 | 1111110011 |
| 468 | 1111001110 | 500 | 1111110100 |
| 469 | 1111001111 | 501 | 1111110101 |
| 470 | 1111010000 | 502 | 1111110110 |
| 471 | 1111010001 | 503 | 1111110111 |
| 472 | 1111010011 | 504 | 1111111000 |
| 473 | 1111010111 | 505 | 1111111001 |
| 474 | 1111011000 | 506 | 1111111010 |
| 475 | 1111011001 | 507 | 1111111011 |
| 476 | 1111011011 | 508 | 1111111100 |
| 477 | 1111011100 | 509 | 1111111101 |
| 478 | 1111011101 | 510 | 1111111110 |
| 479 | 1111011110 | 511 | 1111111111 |

MEMORY SYSTEM

CROSS-REFERENCE TO RELATED APPLICATION

This application is based upon and claims the benefit of priority from Japanese Patent Application No. 2019-104682, filed on Jun. 4, 2019, the entire contents of which are incorporated herein by reference.

FIELD

Embodiments described herein relate generally to a memory system.

BACKGROUND

A memory system including a non-volatile memory such as a NAND-type flash memory, and a memory controller, is known.

DESCRIPTION OF THE DRAWINGS

FIG. 4 is an example of a conversion table used in converting from the first data into the second data in the memory system according to the first embodiment.

FIGS. 5A-5H depict another example of the conversion table used in converting from the first data into the second data in the memory system according to the first embodiment.

DETAILED DESCRIPTION

Figure 1:
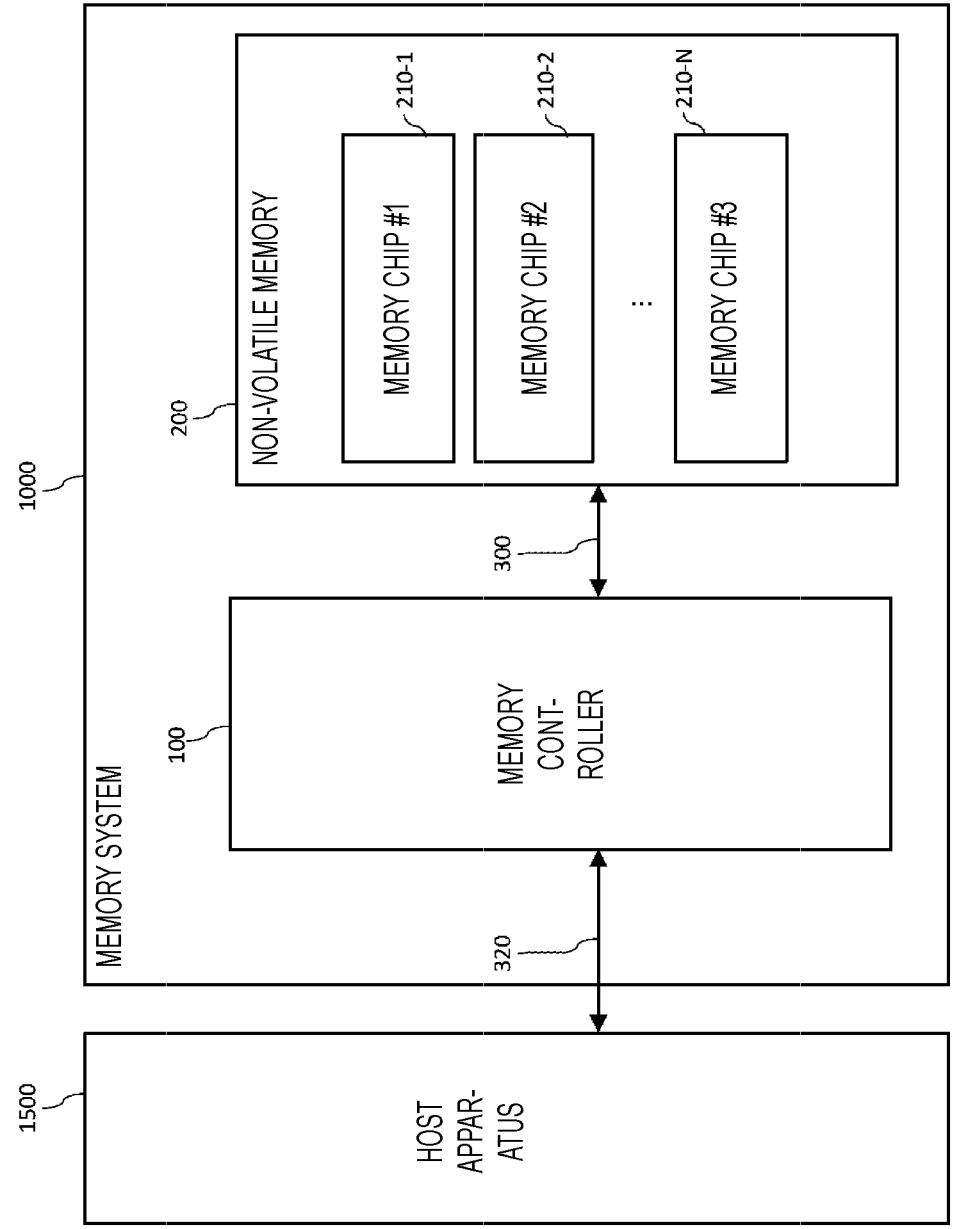
FIG. 1 is a block diagram illustrating an example of an overall configuration of a memory system connected to a host apparatus according to a first embodiment.

In general, according to one embodiment, a memory system includes a non-volatile memory and a controller that includes a first toggle encoder configured to encode first data having a first bit length and a first number of toggles, into second data having a second bit length longer than the first bit length and a second number of toggles smaller than the first number of toggles, and transmit the second data to the non-volatile memory.

Hereinafter, embodiments will be described with reference to the drawings. In the following description, components having the same function and configuration will be denoted by the same reference numerals. In addition, each embodiment described hereinbelow is an example of an apparatus or a method for implementing the technical idea of the embodiment, and does not limit the materials, shapes, structures, arrangements, etc. of components described hereinbelow.

Each functional block may be implemented as hardware, computer software or a combination thereof. Thus, in order to clarify that each functional block is any one of hardware, software, and a combination thereof, descriptions will generally be made in view of functions. It is not necessary that the functional blocks are distinguished as in the examples described hereinafter. For example, some functions may be executed by functional blocks other than the functional blocks in the examples. Further, the functional block in the examples may be divided into more detailed functional sub-blocks.

First Embodiment

FIG. 1 is a block diagram illustrating an example of an overall configuration of a memory system 1000 connected to a host apparatus according to the embodiment. As illustrated in FIG. 1, the memory system 1000 has a configuration where a memory controller 100 and a non-volatile memory 200 are connected to each other via a memory bus 300. The memory system 1000 is connected to a host apparatus 1500 via a communication interface 320, and functions as an external storage device of the host apparatus 1500.

The memory system 1000 may be a memory card in which the memory controller 100 and the non-volatile memory 200 are configured as one package, or a Solid State Drive (SSD).

The host apparatus 1500 may be, for example, an information processing apparatus such as a personal computer, a mobile phone, an image capturing device, a portable terminal such as a tablet computer or a smart phone, a game device, or an on-vehicle terminal such as a car navigation system.

The communication interface 320 connects the memory system 1000 to the host apparatus 1500. The communication interface 320 conforms to, for example, Serial Advanced Technology Attachment (SATA), Serial Attached SCSI (SAS), Peripheral Components Interconnect Express (PCIe) (registered trademark), or Non-Volatile Memory Express (NVMe) (registered trademark).

The memory controller 100 controls writing/reading of data to/from the non-volatile memory 200 in response to a request from the host apparatus 1500. In the present embodiment, the request is, for example, an instruction or a command. The memory controller is also referred to as a controller. The memory controller 100 is a semiconductor integrated circuit configured as, for example, a System on a Chip (SoC), a Field-Programmable Gate Array (FPGA), or an Application Specific Integrated Circuit (ASIC). Some or all of functions of the respective components of the memory controller 100 to be described below, including first toggle encoder, second toggle encoder, host interface, and memory interface, may be implemented by execution of firmware by a central processing unit (CPU), or may be implemented by hardware.

The non-volatile memory 200 is a semiconductor memory capable of storing data in a non-volatile manner. The non-volatile memory 200 is, for example, a NAND-type flash memory. In the NAND-type flash memory, writing and reading of data are executed on a per page basis. Further, in the NAND-type flash memory, erasing of data is executed on a per block basis. When the NAND-type flash memory is used for the non-volatile memory 200, the memory cell may be a single-level cell in which data of 1 bit is to be stored, or may be a multi-level cell in which data of 2 or more bits is to be stored.

The non-volatile memory 200 includes, for example, a plurality of memory chips #1 210-1, #2 210-2, . . . , and #N 210-N that are operable independently of each other. In addition, the "N" is any natural number greater than 1.

In the following description, when one of the plurality of memory chips #1 210-1, #2 210-2, . . . , and #N 210-N needs to be specified, the reference numeral 210-1, 210-2 . . . , or 210-N will be used. On the other hand, when any one memory chip is referred to, or when one memory chip does not need to be distinguished from another memory chip, the reference numeral 210 will be used without the suffix -1, -2, . . . , or -N.

In addition, while the present embodiment shows an example in which a NAND-type flash memory is used as the non-volatile memory 200, the non-volatile memory 200 may also be a storage unit other than the NAND-type flash memory, such as a three-dimensional structure flash memory, a Resistance Random Access Memory (ReRAM), a Ferroelectric Random Access Memory (FeRAM), or a Magnetoresistive Random Access Memory (MRAM). Further, while the present embodiment shows an example in which a semiconductor memory is used as the non-volatile memory 200, a storage unit other than the semiconductor memory may also be used.

Figure 2:
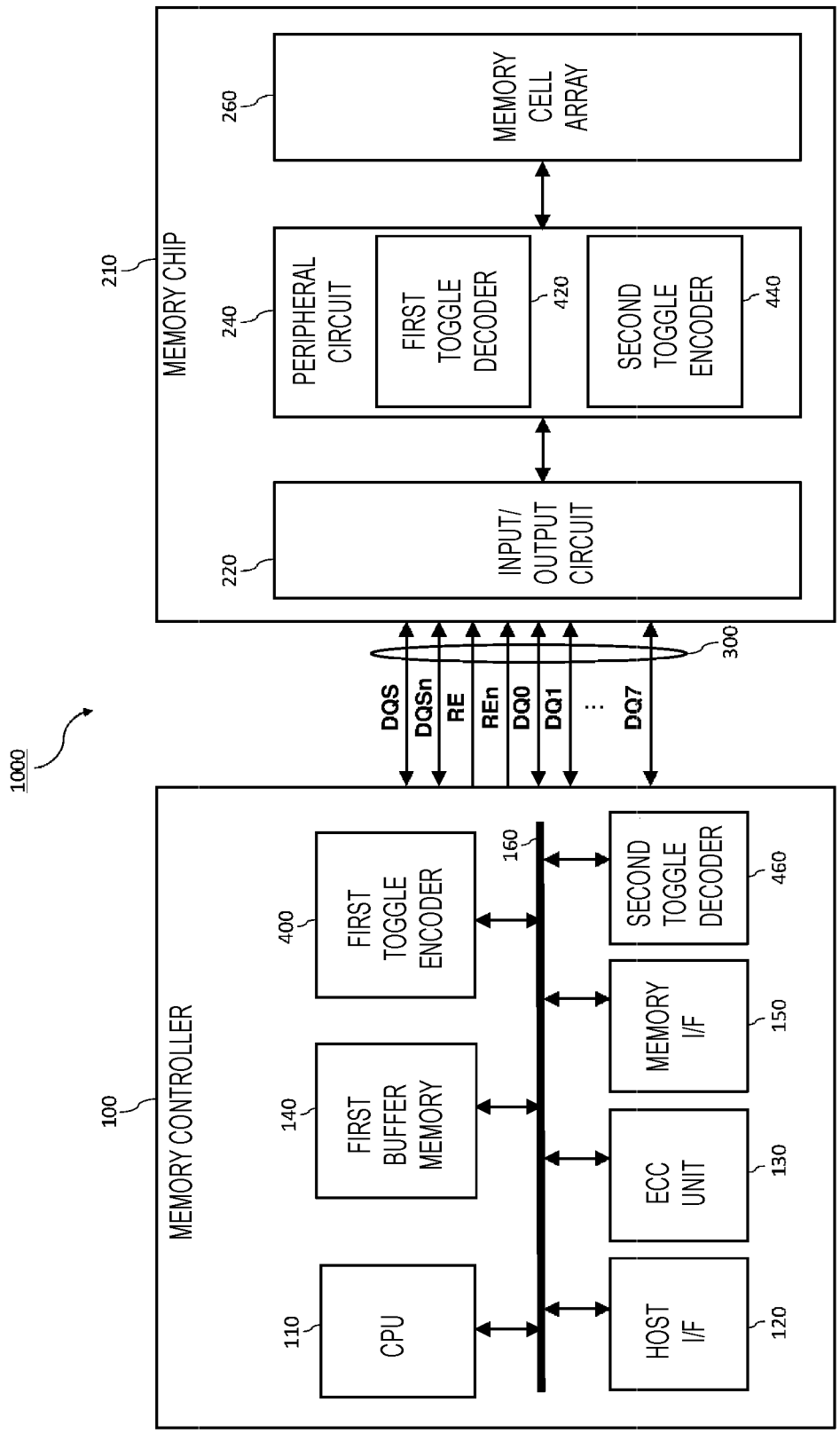
FIG. 2 is a block diagram illustrating an example of a configuration of a memory controller and a memory chip of the memory system according to the first embodiment.

FIG. 2 is a block diagram illustrating an example of a configuration of the memory controller 100 and the memory chip 210 of the memory system 1000 according to the present embodiment.

Each configuration of the memory controller 100 will be described. As illustrated in FIG. 2, the memory controller 100 has a configuration in which a CPU 110, a host interface (I/F) 120, an error check and correction (ECC) unit 130, a first buffer memory 140, a memory interface (I/F) 150, a first toggle encoder 400, and a second toggle decoder 460 are connected to each other via an internal bus 160.

In the present embodiment, descriptions are given for a case where the memory controller 100 includes the first toggle encoder 400 and the second toggle decoder 460. However, one of the first toggle encoder 400 and the second toggle decoder 460 may be present outside the memory controller 100, and the other may be present inside the memory controller 100, or both of the first toggle encoder 400 and the second toggle decoder 460 may be present outside the memory controller 100.

The CPU 110 collectively controls the respective components of the memory system 1000. The CPU 110 reads firmware (a control program) stored in a ROM (not illustrated), and loads it into the first buffer memory 140 or on a RAM (not illustrated) when the memory system 1000 is started. Then, when the CPU 110 executes the firmware, each function implemented in the firmware is performed.

When a request is received from the host apparatus 1500 via the host I/F 120, the CPU 110 controls each unit of the memory controller 100 in response to the request. For example, the CPU 110 instructs the memory I/F 150 to write data to the non-volatile memory 200 in response to a write request from the host apparatus 1500. In addition, the CPU 110 instructs the memory I/F 150 to read data from the non-volatile memory 200 in response to a read request from the host apparatus 1500.

In addition, when a write request is received from the host apparatus 1500, the CPU 110 saves data designated by the write request, in the first buffer memory 140, and determines a storage area for the data, in the non-volatile memory 200. That is, the CPU 110 determines and manages a writing destination of data. The association relationship between a logical address of data received from the host apparatus 1500 and a physical address indicating a storage area in the non-volatile memory 200 in which the corresponding data is to be stored is stored as an address conversion table in, for example, the first buffer memory 140.

In addition, when a read request is received from the host apparatus 1500, the CPU 110 converts a logical address designated by the read request into a physical address of the non-volatile memory 200 by using the above-described address conversion table, and instructs the memory I/F 150 to read data from the corresponding physical address. Accordingly, the data read from the non-volatile memory 200 is temporarily stored in the first buffer memory 140, and transmitted to the host apparatus 1500 via the host I/F 120.

The host I/F 120 outputs a request, write data, etc. received from the host apparatus 1500 to the internal bus 160, and stores the request, the write data, etc. in the first buffer memory 140. Further, the host I/F 120 transmits, for example, the read data that has been read from the non-volatile memory 200 and stored in the first buffer memory 140, or a response from the CPU 110, to the host apparatus 1500.

The ECC unit 130 is, for example, an encoding/decoding circuit having an error correction function, and encodes data to be written to the non-volatile memory 200 by an error correction code (ECC) such as a Bose Chaudhuri Hocquenghem (BCH) code. Further, the ECC unit 130 corrects error in data read from the non-volatile memory 200.

The data received as write data from the host apparatus 1500 by the host interface 120 is temporarily stored in the first buffer memory 140. The CPU 110 determines a storage area for the data stored in the first buffer memory 140, in the non-volatile memory 200, and instructs the memory I/F 150 to write the data to the determined storage area.

For the first buffer memory 140, for example, a volatile memory such as a Dynamic Random Access Memory (DRAM) or a Static Random Access Memory (SRAM) may be used. In addition, the first buffer memory 140 may be mounted inside or outside the memory controller 100.

The memory I/F 150 controls a process of writing data, etc. to the non-volatile memory 200 and a process of reading data, etc. from the non-volatile memory 200 based on an instruction from the CPU 110.

The memory I/F 150 transmits write data, etc. received from the first buffer memory 140 to the non-volatile memory 200 after encoding the write data using the first toggle encoder 400, based on an instruction from the CPU 110. Further, the memory I/F 150 transmits read data, etc. received from the non-volatile memory 200 to the first buffer memory 140 after decoding the read data using the second toggle decoder 460.

The internal bus 160 is a communication line that connects the CPU 110, the host I/F 120, the ECC unit 130, the first buffer memory 140, the memory I/F 150, the first toggle encoder 400, and the second toggle decoder 460 to each other.

Details of the first toggle encoder 400 and the second toggle decoder 460 will be described later.

Next, a configuration of the memory chip 210 will be described. The memory chip 210 is, for example, a NAND-type flash memory chip.

As illustrated in FIG. 2, the memory chip 210 includes an input/output circuit 220, a peripheral circuit 240, and a memory cell array 260.

The input/output circuit 220 is connected to the memory I/F 150 of the memory controller 100 via the memory bus 300. The input/output circuit 220 receives a plurality of control signals from the memory controller 100 via the memory bus 300, and supplies various internal control signals to the peripheral circuit 240 based on the received control signals.

The input/output circuit 220 receives write data from the memory controller 100, and supplies the received write data to the peripheral circuit 240. Further, the input/output circuit 220 receives data stored in a cell transistor of the memory cell array 260, from the peripheral circuit 240, and supplies the data to the memory controller 100 via the memory bus 300.

The peripheral circuit 240 includes a first toggle decoder 420 and a second toggle encoder 440, and also a sequencer, a driver, a sense amplifier, a low decoder, etc. (not illustrated). The peripheral circuit 240 receives various signals from the input/output circuit 220, and writes data to a cell transistor of the memory cell array 260 based on the received signals. Further, the peripheral circuit 240 reads data stored in the cell transistor of the memory cell array 260.

The peripheral circuit 240 writes write data, etc. received from the input/output circuit 220, to the memory cell array 260 after encoding the write data using the first toggle decoder 420. Further, the peripheral circuit 240 transmits read data, etc. received from the memory cell array 260, to the input/output circuit 220 after decoding the read data using the second toggle encoder 440.

In the present embodiment, descriptions are given for a case where the peripheral circuit 240 includes the first toggle decoder 420 and the second toggle encoder 440. However, one of the first toggle decoder 420 and the second toggle encoder 440 may be present outside the peripheral circuit 240, and the other may be present inside the peripheral circuit 240. Furthermore, both the first toggle decoder 420 and the second toggle encoder 440 may be present outside the peripheral circuit 240.

Details of the first toggle decoder 420 and the second toggle encoder 440 will be described later.

At the time of writing, the memory cell array 260 receives data from the peripheral circuit 240, and stores the received data in a cell transistor. In addition, at the time of reading, the memory cell array 260 supplies data stored in the cell transistor to the peripheral circuit 240.

Figure 3:
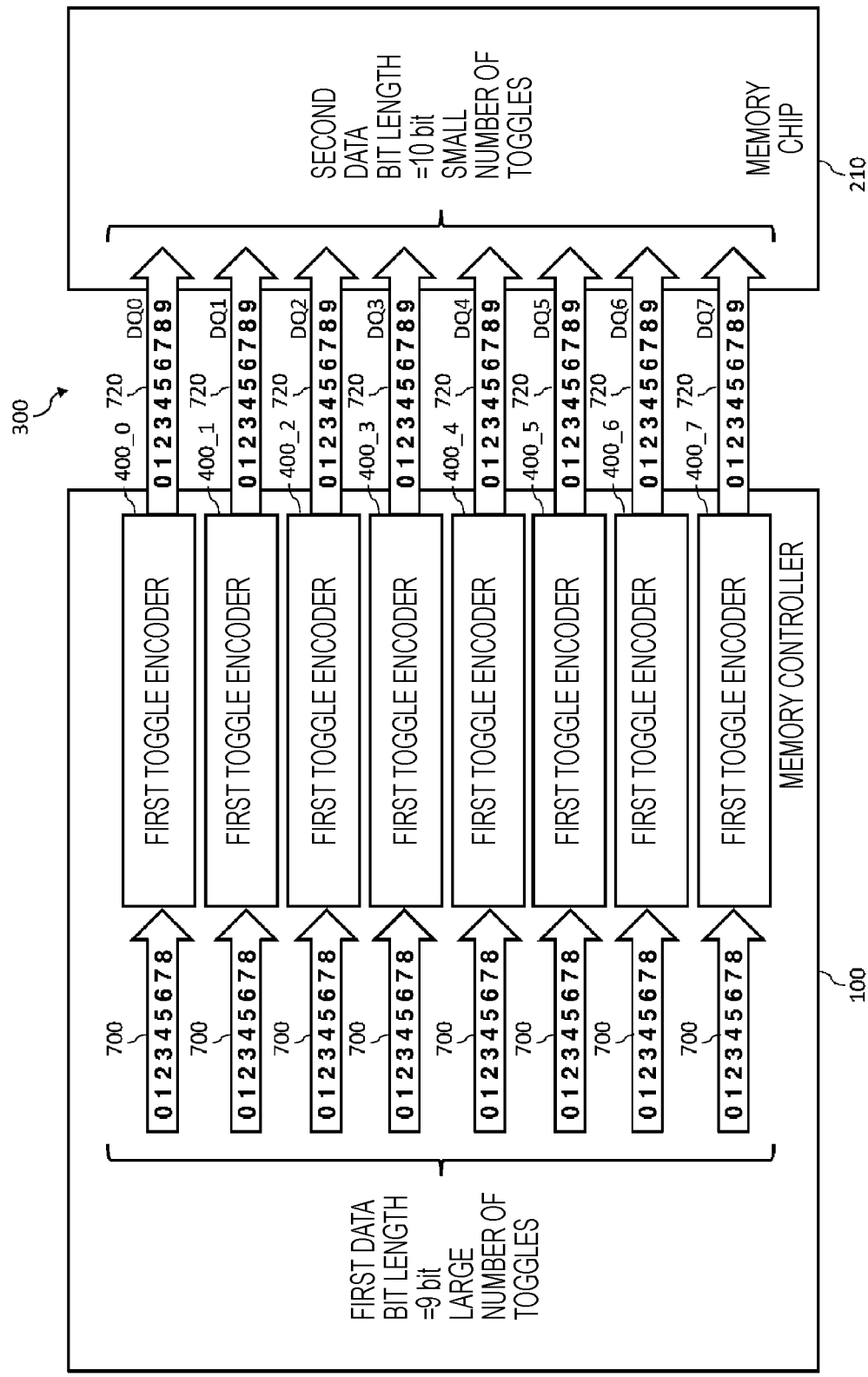
FIG. 3 is a block diagram illustrating an example of encoding of first data into second data by a first toggle encoder in the memory system according to the first embodiment.

FIG. 3 is a block diagram illustrating an example of encoding of first data 700 into second data 720 by the first toggle encoder 400 in the memory system 1000 according to the present embodiment. Hereinafter, the encoding of the first data 700 into the second data 720 is also referred to as a conversion from the first data 700 into the second data 720.

As illustrated in FIG. 3, the first toggle encoder 400 encodes the first data 700 having a first bit length and a first number of toggles, into the second data 720 having a second bit length longer than the first bit length and a second number of toggles smaller than the first number of toggles. In addition, as described later with reference to FIG. 4, encoding may be performed such that the number of toggles of the second data 720 is equal to or smaller than the number of toggles of the first data 700. In addition, as described later with reference to FIGS. 5A to 5H, encoding may be performed such that an average of the numbers of toggles of a plurality of second data pieces 720 is smaller than an average of the numbers of toggles of a plurality of first data pieces 700. The first bit length is, for example, 9 bits, and the second bit length is, for example, 10 bits. As used herein, transitions from 0 to 1 or from 1 to 0 in a binary representation of a number are referred to as "toggles." Therefore, the number of "toggles" is equal to the number of such transitions. For example, the number of transitions or "toggles" in a binary number "0101" would be 3 and the number of transitions or "toggles" in a binary number "001100" would be 2.

In addition, the first toggle encoder 400 encodes the first data pieces 700 corresponding to the width of a signal DQ to be described later, into the second data pieces 720. FIG. 3 illustrates a case where the signal DQ has a width of 8 bits, and accordingly, eight first data pieces 700 are encoded into eight second data pieces 720 in first toggle encoders 400_0 to 400_7.

In the present embodiment, the first data 700 encoded by the first toggle encoder 400 is, for example, write data. Other examples of the first data 700 include a command, an address, etc. In addition, the first data 700 may be not only data received as write data from the host apparatus 1500, but also data to be used for internal processing such as garbage collection (compaction), wear leveling, and refreshing.

The first toggle encoder 400 has a second buffer memory (not illustrated) that temporarily stores the first data 700 received from the first buffer memory 140. The first data 700 stored in the second buffer memory is encoded into the second data 720 by the first toggle encoder 400, and then, transmitted to the memory chip 210 by the memory I/F 150. For the second buffer memory, for example, a volatile memory such as a Static Random Access Memory (SRAM) or a register may be used.

FIG. 4 is an example of a conversion table from the first data 700 into the second data 720 in the memory system 1000 according to the first embodiment.

In FIG. 4, descriptions are given for a case where the first data 700 has a bit length of 4 bits, and the second data 720 has a bit length of 5 bits. For example, as illustrated in row A of FIG. 4, the first toggle encoder 400 encodes data "0011" in which the bit length is 4 bits and the number of toggles is 1, into data "11000" in which the bit length is 5 bits and the number of toggles is 1, by using the conversion table in FIG. 4. As another example, as illustrated in row B of FIG. 4, data "0100" in which the bit length is 4 bits and the number of toggles is 2 is encoded into data "11110" in which the bit length is 5 bits and the number of toggles is 1. As another example, as illustrated in row C of FIG. 4, data "0101" in which the bit length is 4 bits and the number of toggles is 3 is encoded into data "10001" in which the bit length is 5 bits and the number of toggles is 2. The same also applies to other cases, and in every case, encoding is performed such that the number of toggles of the second data 720 is equal to or smaller than the number of toggles of the first data 700. In addition, the same conversion is also performed in other cases where the first data 700 has a bit length of 4 bits, and the second data 720 has a bit length of 5 bits.

FIGS. 5A to 5H illustrate another example of the conversion table from the first data 700 into the second data 720 in the memory system 1000 according to the first embodiment. In FIGS. 5A to 5H, a first data group including the plurality of first data pieces 700 each of which has a bit length of 9 bits is written in decimal notation, and a second data group including the plurality of second data pieces 720 each of which has a bit length of 10 bits is written in binary notation.

In FIGS. 5A to 5H, among 1024 data pieces (also referred to herein as codes) represented by the bit length of 10 bits, only 512 data pieces in an ascending order of the number of toggles are described as the second data group. Among the 1024 data pieces represented by the bit length of 10 bits, the 512 data pieces in an ascending order of the number of toggles are employed as the second data pieces 720. Accordingly, an average of the numbers of toggles of the 512 second data pieces 720 in the second data group is, for example, 3.8. In addition, an average of the numbers of toggles of the 512 first data pieces 700 with the 9-bit bit length in the first data group is, for example, 4.5. In this manner, the average of the numbers of toggles of the second data pieces 720 in the second data group is smaller than the average of the numbers of toggles of the first data pieces 700 in the first data group.

In addition, although with regard to a specific first data piece 700 in the first data group, the number of toggles may be increased due to encoding, the average of the numbers of toggles of the second data group is smaller than the average of the numbers of toggles of the first data group. Further, the encoding at this time is not limited to a conversion from 9 bits into 10 bits, and may be, for example, a conversion from 9 bits into 11 bits.

In the second toggle encoder 440 as well, encoding is similarly performed by using the conversion table in FIG. 4 or FIGS. 5A to 5H. Further, in the first toggle decoder 420 and the second toggle decoder 460, decoding is performed by using the conversion table in FIG. 4 or FIGS. 5A to 5H.

Figure 6:
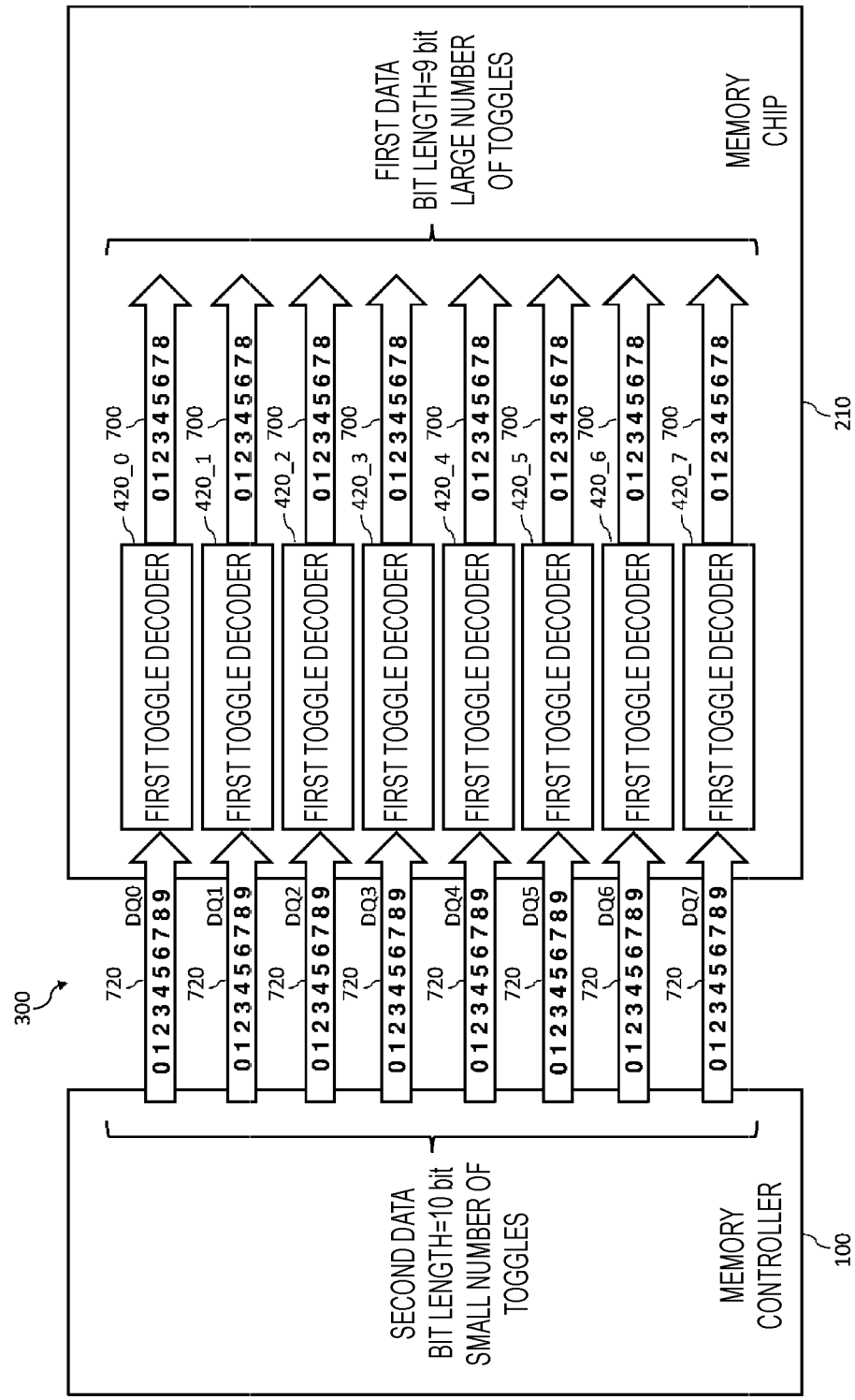
FIG. 6 is a block diagram illustrating an example of decoding of the second data into the first data by a first toggle decoder in the memory system according to the first embodiment.

FIG. 6 is a block diagram illustrating an example of decoding of the second data 720 into the first data 700 by the first toggle decoder 420 in the memory system according to the present embodiment.

As illustrated in FIG. 6, the first toggle decoder 420 decodes the second data 720 into the original first data 700. As illustrated in FIGS. 2 and 3, the first data 700 is encoded into the second data 720 by the first toggle encoder 400, and then, transmitted from the memory controller 100 to the memory chip 210. Next, the second data 720 is decoded into the original first data 700 by the first toggle decoder 420. Then, the first data 700 is written to the memory cell array 260.

In addition, the first toggle decoder 420 decodes the second data pieces 720 corresponding to the width of a signal DQ to be described later, into the first data pieces 700. FIG. 6 illustrates a case where the signal DQ has a width of 8 bits, and accordingly, eight second data pieces 720 are decoded into eight first data pieces 700 in first toggle decoders 4200 to 420_7.

The first toggle decoder 420 has a third buffer memory (not illustrated) that temporarily stores the second data 720 received from the input/output circuit 220. The second data 720 stored in the third buffer memory is decoded into the first data 700 by the first toggle decoder 420, and then, written to the memory cell array 260 by the peripheral circuit 240. For the third buffer memory, for example, a volatile memory such as a SRAM or a register may be used.

Figure 7:
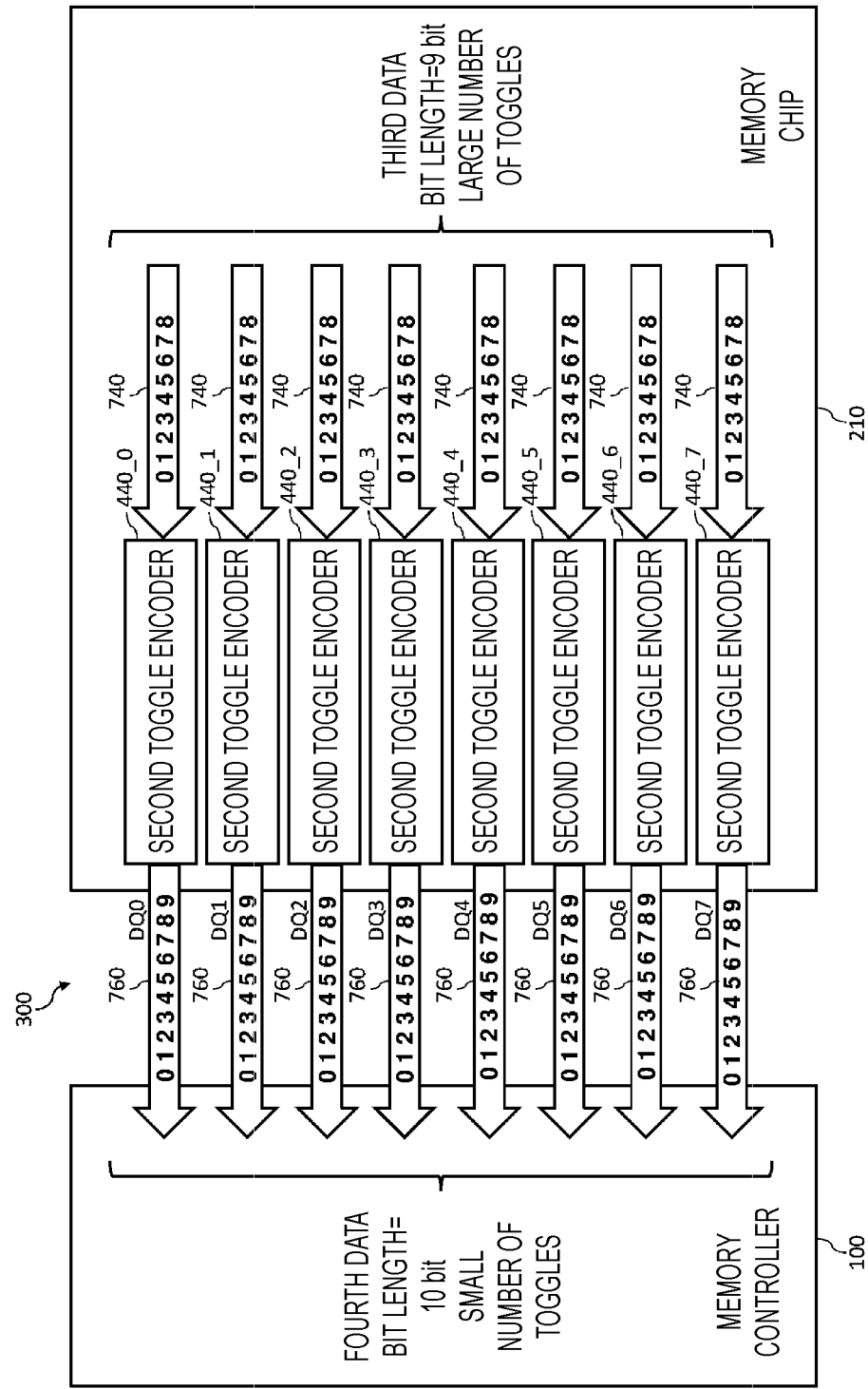
FIG. 7 is a block diagram illustrating an example of encoding of third data into fourth data by a second toggle encoder in the memory system according to the first embodiment.

FIG. 7 is a block diagram illustrating an example of encoding of third data 740 into fourth data 760 by the second toggle encoder 440 in the memory system 1000 according to the present embodiment.

As illustrated in FIG. 7, the second toggle encoder 440 encodes the third data 740 having a third bit length and a third number of toggles, into the fourth data 760 having a fourth bit length longer than the third bit length and a fourth number of toggles smaller than the third number of toggles. In addition, as described above with reference to FIG. 4, encoding may be performed such that the number of toggles of the fourth data 760 is equal to or smaller than the number of toggles of the third data 740. In addition, as described above with reference to FIGS. 5A to 5H, encoding may be performed such that an average of the numbers of toggles of a plurality of fourth data pieces 760 is smaller than an average of the numbers of toggles of a plurality of third data pieces 740. The third bit length is, for example, 9 bits, and the fourth bit length is, for example, 10 bits. In addition, the second toggle encoder 440 encodes the third data pieces 740 corresponding to the width of a signal DQ to be described later, into the fourth data pieces 760. FIG. 7 illustrates a case where the signal DQ has a width of 8 bits, and accordingly, eight third data pieces 740 are encoded into eight fourth data pieces 760 in second toggle encoders 440_0 to 440_7.

In the present embodiment, the third data 740 encoded by the second toggle encoder 440 is, for example, data read from the memory cell array 260. Other examples of the third data 740 may be data to be used for an internal processing such as garbage collection, wear leveling, and refreshing. In addition, the third data 740 may be a status, etc. to be transmitted from the memory chip 210 to the memory controller 100.

In addition, the bit length of the third data 740 may be the same as or different from that of the first data 700. In addition, the number of toggles of the third data 740 may be the same as or different from that of the first data 700. In particular, when the first data 700 is written to the memory cell array 260 and is correctly readable as the third data 740, the bit length and the number of toggles of the first data 700 are the same as those of the third data 740.

In addition, the bit length of the fourth data 760 may be the same as or different from that of the second data 720. In addition, the number of toggles of the fourth data 760 may be the same as or different from that of the second data 720. In particular, when the first data 700 is written to the memory cell array 260 and is correctly readable as the third data 740, the bit length and the number of toggles of the second data 720 are the same as those of the fourth data 760.

The second toggle encoder 440 includes a fourth buffer memory (not illustrated) that temporarily stores the third data 740 received from the memory cell array 260. A command for requesting to read the third data 740 from the memory cell array 260 is output from the memory controller 100 to the memory chip 210. The third data 740 stored in the fourth buffer memory is encoded into the fourth data 760 by the second toggle encoder 440, and then, transmitted to the memory controller 100 by the peripheral circuit 240. For the fourth buffer memory, for example, a volatile memory such as an SRAM or a register may be used.

Figure 8:
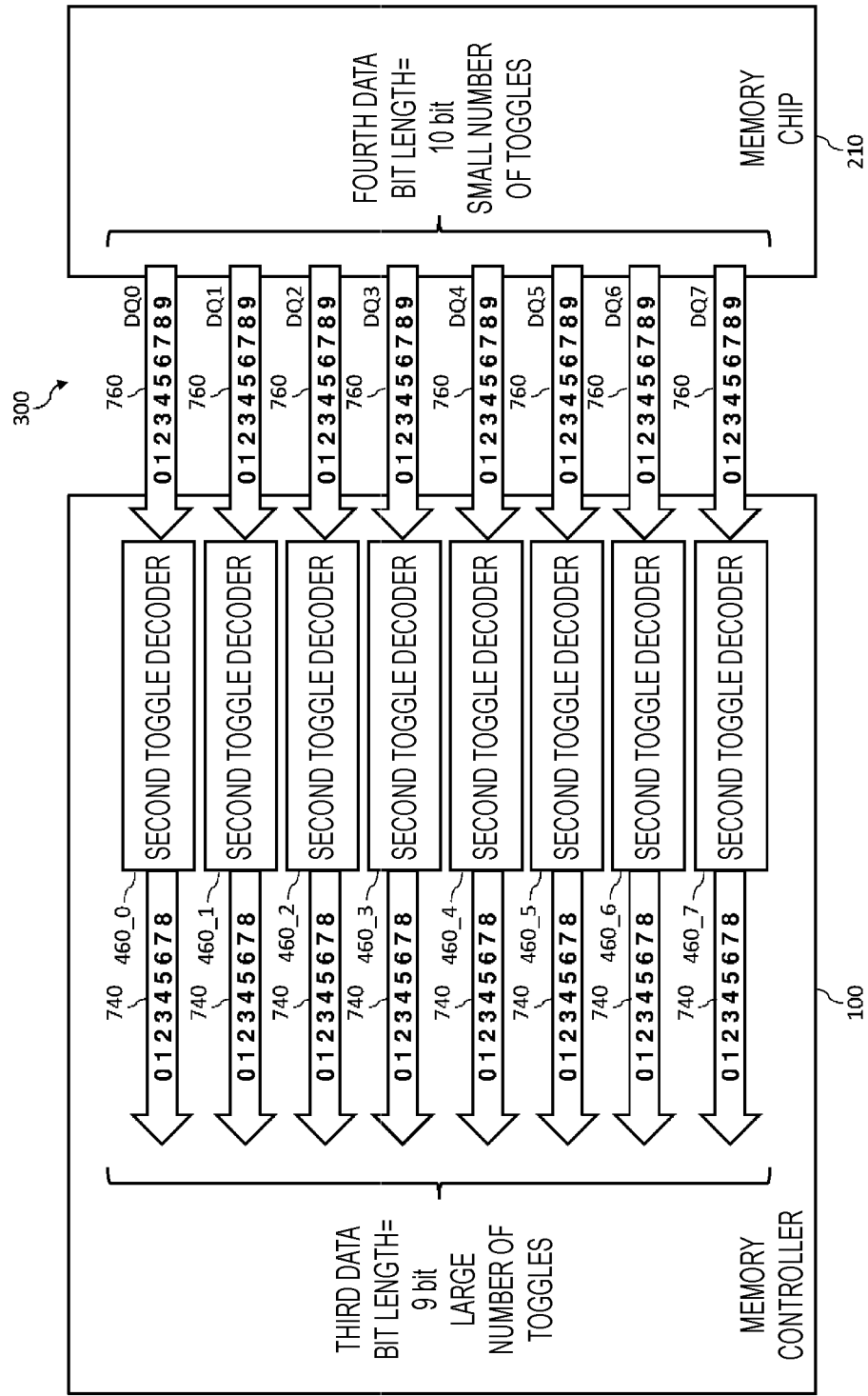
FIG. 8 is a block diagram illustrating an example of decoding of the fourth data into the third data by a second toggle decoder in the memory system according to the first embodiment.

FIG. 8 is a block diagram illustrating an example of decoding of the fourth data 760 into the third data 740 by the second toggle decoder 460 in the memory system 1000 according to the present embodiment.

As illustrated in FIG. 8, the second toggle decoder 460 decodes the fourth data 760 into the original third data 740. As illustrated in FIGS. 2 and 7, the third data 740 is encoded into the fourth data 760 by the second toggle encoder 440, and then, transmitted from the memory chip 210 to the memory controller 100. Next, the fourth data 760 is decoded into the original third data 740 by the second toggle decoder 460.

In addition, the second toggle decoder 460 decodes the fourth data pieces 760 corresponding to the width of a signal DQ to be described later, into the third data pieces 740. FIG. 8 illustrates a case where the signal DQ has a width of 8 bits, and accordingly, eight fourth data pieces 760 are decoded into eight third data pieces 740 in second toggle decoders 460_0 to 460_7.

The second toggle decoder 460 includes a fifth buffer memory (not illustrated) that temporarily stores the fourth data 760 received from the memory I/F 150. The fourth data 760 stored in the fifth buffer memory is decoded into the third data 740 by the second toggle decoder 460, and then, transmitted to the first buffer memory 140 by the memory I/F 150. For the fifth buffer memory, for example, a volatile memory such as an SRAM or a register may be used.

Referring back to FIG. 2, the memory bus 300 will be described.

The memory bus 300 connects the memory controller 100 to the non-volatile memory 200. The memory I/F 150 and the input/output circuit 220 of each memory chip 210 transmit/receive data from/to each other via the memory bus 300. The memory bus 300 conforms to, for example, a Toggle Double Data Rate (DDR) or an Open NAND Flash Interface (ONFI). The memory bus 300 transmits/receives, for example, signals DQ, DQS, DQSn, RE, and REn. When a signal name has "n" as a suffix, the corresponding signal is negative logic. That is, this indicates that the corresponding signal is asserted at a "low (L)" level.

The signal DQ (DQ0 to DQ7) has, for example, a width of 8 bits, and includes data, such as a command, data to be written to the memory chip 210, data read from the memory chip 210, an address, or a status.

At the time of writing data to the memory cell array 260 in the memory chip 210, the first data 700 received from the host I/F 120 is encoded by the first toggle encoder 400, and input to the input/output circuit 220 of the memory chip 210 as the second data 720 (=signals DQ0 to DQ7) via the memory bus 300. The second data 720 input to the input/output circuit 220 is transmitted to the peripheral circuit 240, decoded into the first data 700 by the first toggle decoder 420, and then, written to the memory cell array 260. At the time of reading data, the third data 740 written to the memory cell array 260 is encoded into the fourth data 760 by the second toggle encoder 440. The fourth data 760 (=signals DQ0 to DQ7) is transmitted to the memory controller 100 via the memory bus 300, and decoded into the third data 740 by the second toggle decoder 460. In addition, the third data 740 may be the first data 700 written to the memory cell array 260. In this case, the bit length and the number of toggles of the first data 700 are the same as those of the third data 740.

The signals DQS and DQSn are synchronous signals that are exchanged bidirectionally between the memory controller 100 and the memory chip 210. The signals DQS and DQSn directed from the memory controller 100 to the memory chip 210 notify the memory chip 210 of a timing for receiving the signal DQ. While the second data 720 is transmitted by the signal DQ, the number of timings notified by the signals DQS and DQSn corresponds to the second bit length of the second data 720.

Meanwhile, the signals DQS and DQSn directed from the memory chip 210 to the memory controller 100 notify the memory controller 100 of a timing for receiving the signal DQ. While the fourth data 760 is transmitted by the signal DQ, the number of timings notified by the signals DQS and DQSn corresponds to the fourth bit length of the fourth data 760.

At the time of reading data, the signals RE and REn directed from the memory controller 100 to the memory chip 210 instruct the memory chip 210 to output the signal DQ. In addition, the memory chip 210 that receives the signals RE and REn generates the signals DQS and DQSn in synchronization with the signal DQ output in response to the signals RE and REn. When the memory controller 100 instructs the memory chip 210 to output the fourth data 760 in the signal DQ, the memory I/F 150 sets the number of the instructions by the signals RE and REn, to a number corresponding to the number of timings to be notified by the signals DQS and DQSn.

Figure 9:
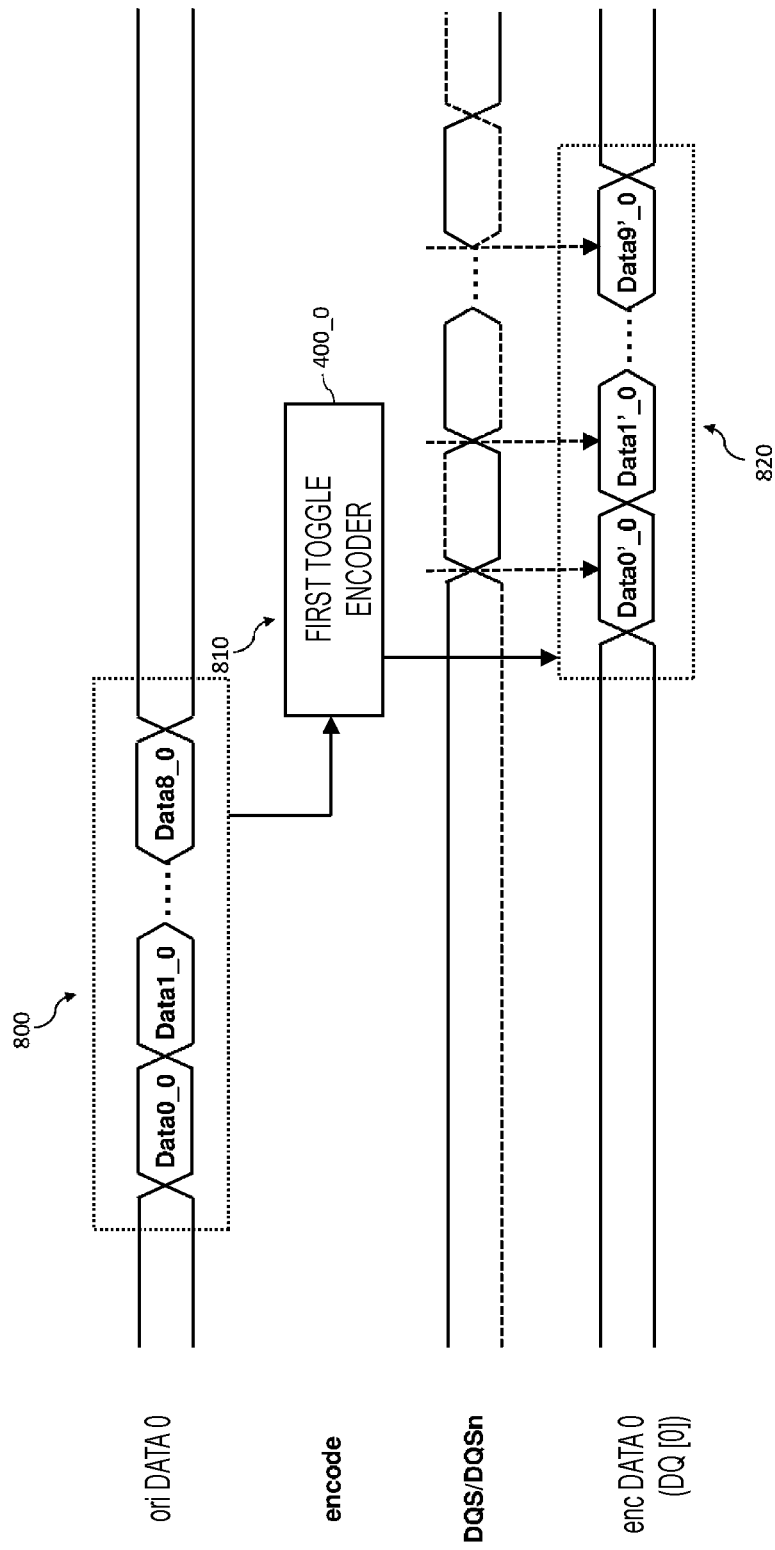
FIG. 9 is an example of a timing chart for illustrating encoding at the time of a writing operation in the memory system according to the first embodiment.
Figure 10:
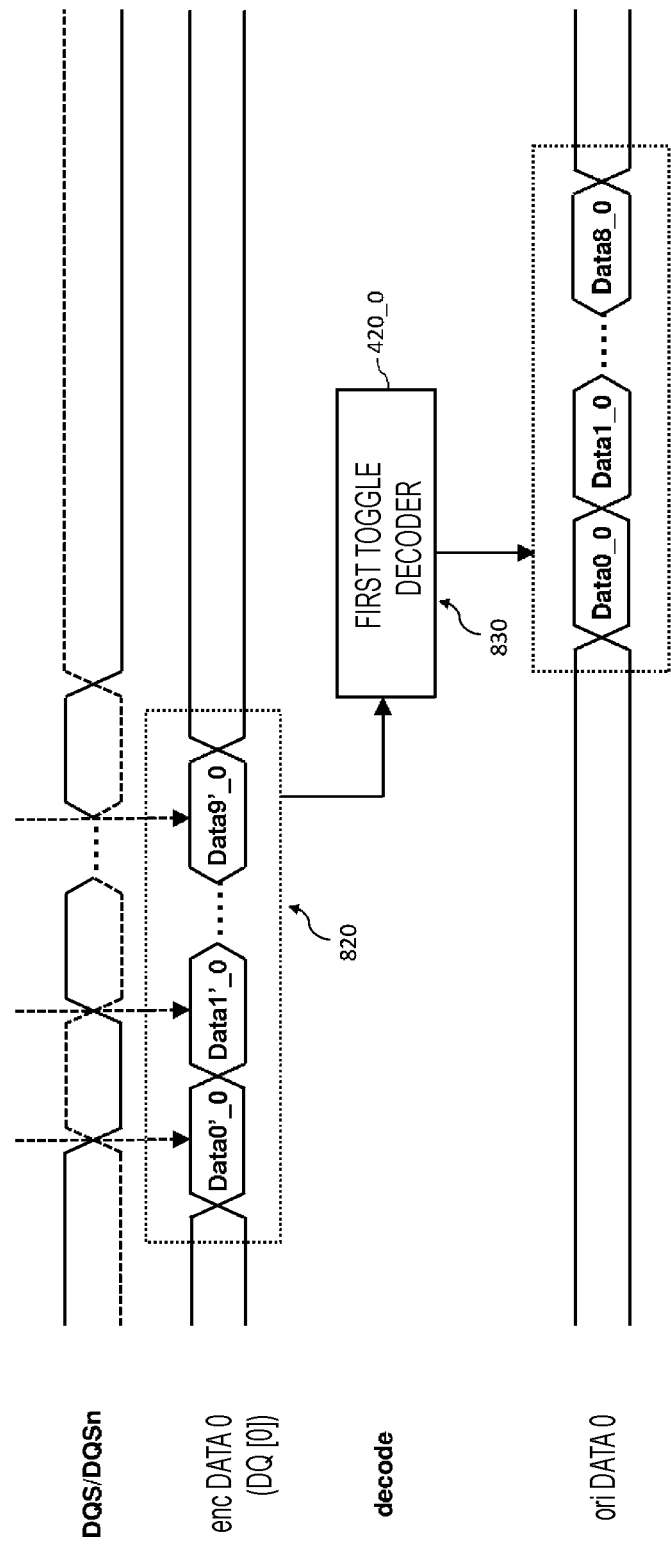
FIG. 10 is an example of a timing chart for illustrating decoding at the time of the writing operation in the memory system according to the first embodiment.

A writing operation of the memory system 1000 will be described. FIG. 9 is an example of a timing chart for illustrating encoding at the time of a writing operation in the memory system 1000. FIG. 10 is an example of a timing chart for illustrating decoding at the time of the writing operation in the memory system 1000. In addition, FIGS. 9 and 10 illustrate a case where the first data 700 has a bit length of 9 bits, and the second data 720 has a bit length of 10 bits.

In FIGS. 9 and 10, the first data 700 with the 9-bit length is described as on DATA 0, and the second data 720 with the 10-bit length is described as enc DATA 0.

As indicated by 800 of FIG. 9, the on DATA 0 is data with the 9-bit length of Data0_0, Data1_0, . . . , and Data8_0.

As indicated by 820 of FIGS. 9 and 10, the enc DATA 0 is data with the 10-bit length of Data0'_0, Data1'_0, . . . , and Data9'_0.

As indicated by 810 of FIG. 9, the on DATA 0 with the 9-bit length stored in the second buffer memory is encoded into the enc data 0 with the 10-bit length, by the first toggle encoder 400_0. The enc DATA 0 is transmitted by a signal DQ[0].

Likewise, on DATA 1 that is the first data 700 with the 9-bit length is encoded into enc DATA 1 that is the second data 720 with the 10-bit length, by the first toggle encoder 400_1. The enc DATA 1 is transmitted by a signal DQ[1].

ori DATA 2 that is the first data 700 with the 9-bit length is encoded into enc DATA 2 that is the second data 720 with the 10-bit length, by the first toggle encoder 400_2. The enc DATA 2 is transmitted by a signal DQ[2].

ori DATA 3 that is the first data 700 with the 9-bit length is encoded into enc DATA 3 that is the second data 720 with the 10-bit length, by the first toggle encoder 400_3. The enc DATA 3 is transmitted by a signal DQ[3].

ori DATA 4 that is the first data 700 with the 9-bit length is encoded into enc DATA 4 that is the second data 720 with the 10-bit length, by the first toggle encoder 400_4. The enc DATA 4 is transmitted by a signal DQ[4].

ori DATA 5 that is the first data 700 with the 9-bit length is encoded into enc DATA 5 that is the second data 720 with the 10-bit length, by the first toggle encoder 400_5. The enc DATA 5 is transmitted by a signal DQ[5].

ori DATA 6 that is the first data 700 with the 9-bit length is encoded into enc DATA 6 that is the second data 720 with the 10-bit length, by the first toggle encoder 400_6. The enc DATA 6 is transmitted by a signal DQ[6].

ori DATA 7 that is the first data 700 with the 9-bit length is encoded into enc DATA 7 that is the second data 720 with the 10-bit length, by the first toggle encoder 400_7. The enc DATA 7 is transmitted by a signal DQ[7].

The memory controller 100 outputs the enc DATA 0 to the enc DATA 7 as the signal DQ, and outputs signals DQS and DQSn to the memory chip 210.

The memory chip 210 receives the enc DATA 0 to the enc DATA 7 in synchronization with the number of timings indicated by the signals DQS and DQSn, and stores the enc DATA 0 to the enc DATA 7 in the third buffer memory of the first toggle decoder 420.

As indicated by 830 of FIG. 10, the enc DATA 0 with the 10-bit length stored in the third buffer memory is decoded into the on DATA 0 with the 9-bit length by the first toggle decoder 420_0.

Likewise, the enc DATA 1 that is the second data 720 with the 10-bit length is decoded into the on DATA 1 with the 9-bit length by the first toggle decoder 420_1.

The enc DATA 2 that is the second data 720 with the 10-bit length is decoded into the on DATA 2 with the 9-bit length by the first toggle decoder 420_2.

The enc DATA 3 that is the second data 720 with the 10-bit length is decoded into the on DATA 3 with the 9-bit length by the first toggle decoder 420_3.

The enc DATA 4 that is the second data 720 with the 10-bit length is decoded into the on DATA 4 with the 9-bit length by the first toggle decoder 420_4.

The enc DATA 5 that is the second data 720 with the 10-bit length is decoded into the on DATA 5 with the 9-bit length by the first toggle decoder 420_5.

The enc DATA 6 that is the second data 720 with the 10-bit length is decoded into the on DATA 6 with the 9-bit length by the first toggle decoder 420_6.

The enc DATA 7 that is the second data 720 with the 10-bit length is decoded into the on DATA 7 with the 9-bit length by the first toggle decoder 420_7.

The on DATA 0 to on DATA 7 are written to the memory cell array 260 by the peripheral circuit 240.

In this manner, the memory controller 100 is capable of writing data to the memory chip 210.

Figure 11:
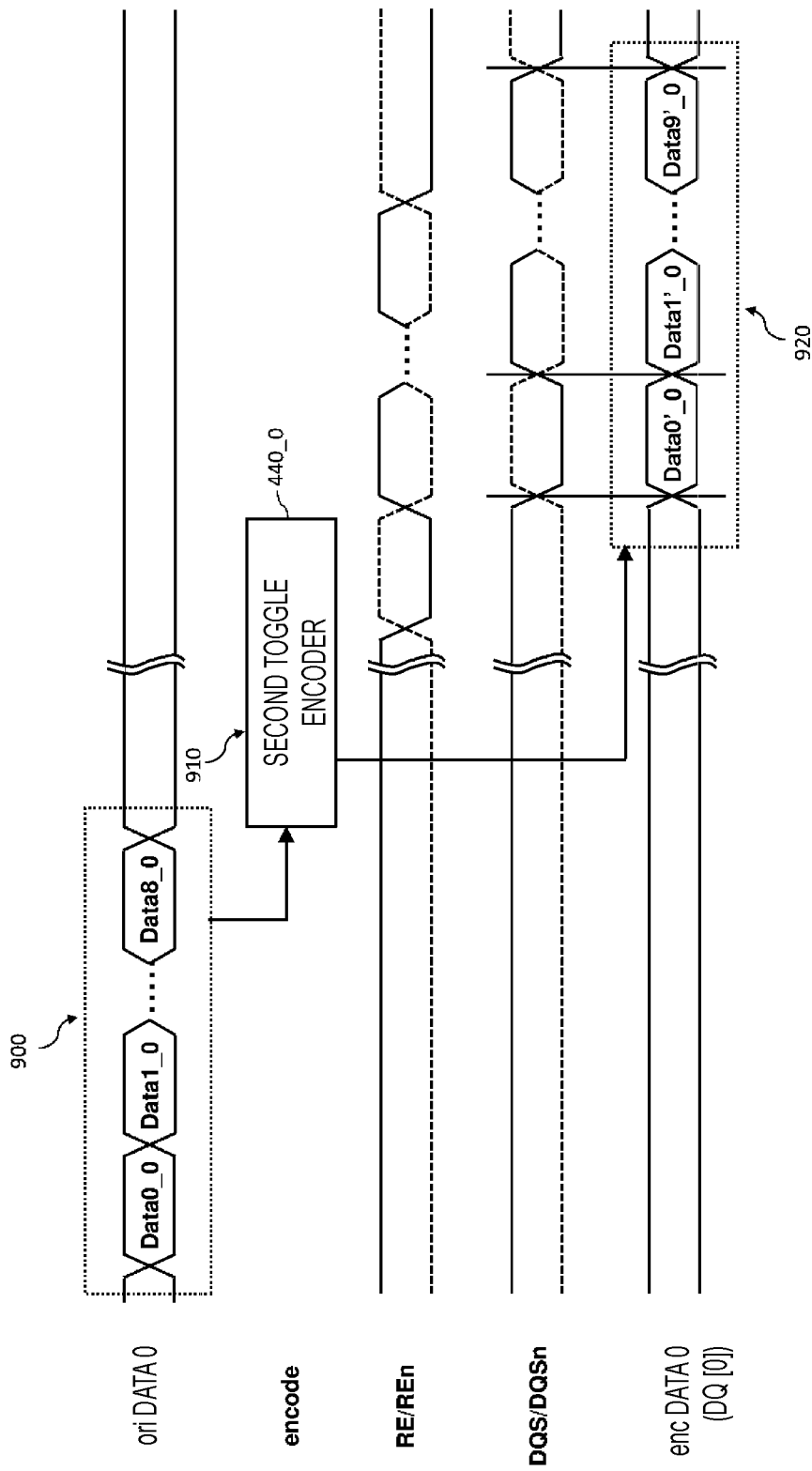
FIG. 11 is an example of a timing chart for illustrating encoding at the time of a reading operation in the memory system according to the first embodiment.
Figure 12:
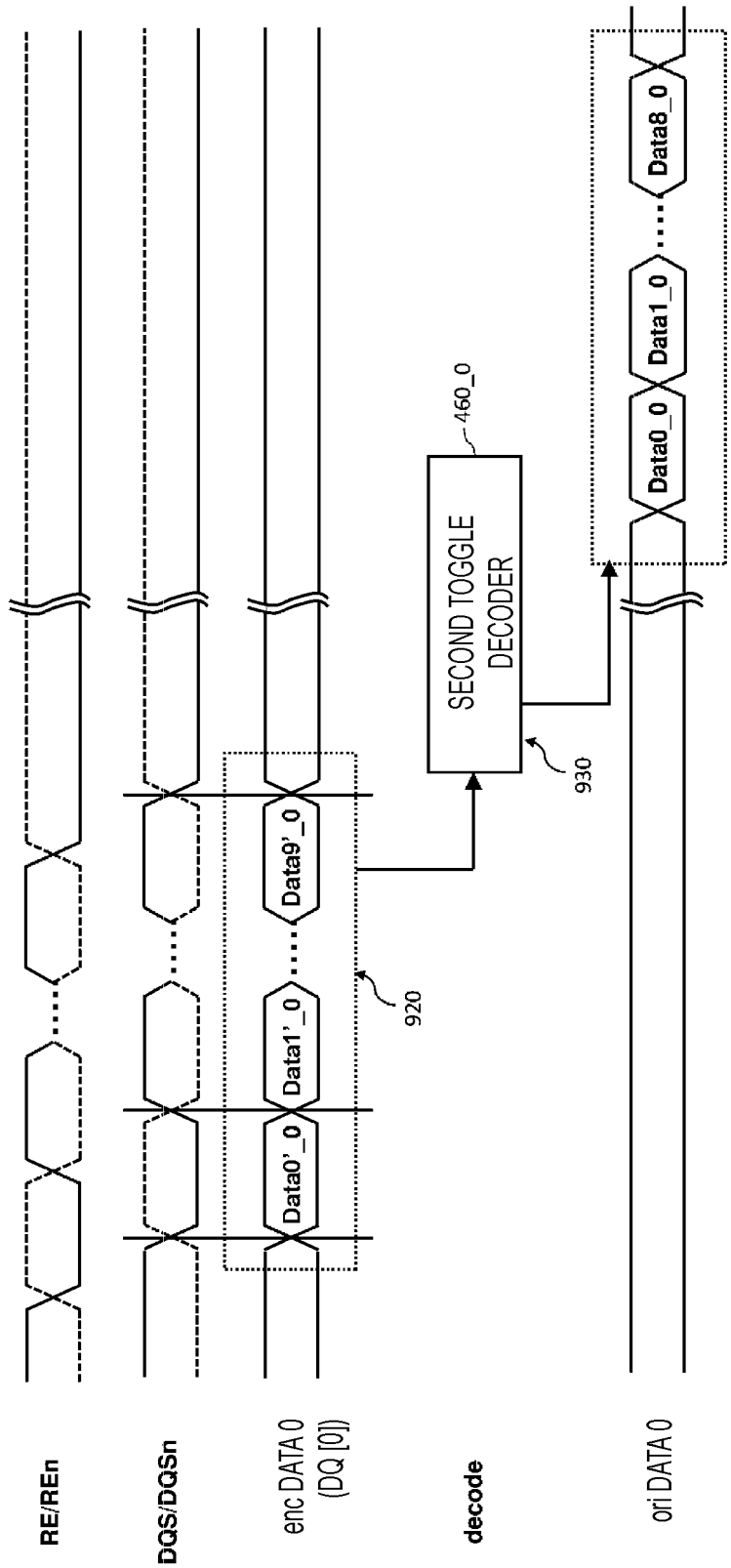
FIG. 12 is an example of a timing chart for illustrating decoding at the time of the reading operation in the memory system according to the first embodiment.

Next, a reading operation of the memory system 1000 will be described. FIG. 11 is an example of a timing chart for illustrating encoding at the time of a reading operation in the memory system 1000. FIG. 12 is an example of a timing chart for illustrating decoding at the time of the reading operation in the memory system 1000. In addition, FIGS. 11 and 12 illustrate a case where the third data 740 has a bit length of 9 bits, and the fourth data 760 has a bit length of 10 bits.

In FIGS. 11 and 12, the third data 740 with the 9-bit length is described as on DATA 0, and the fourth data 760 with the 10-bit length is described as enc DATA 0.

As indicated by 900 of FIG. 11, the on DATA 0 is data with the 9-bit length of Data0_0, Data1_0, . . . , and Data8_0.

As indicated by 920 of FIGS. 11 and 12, the enc DATA 0 is data with the 10-bit length of Data0'_0, Data1' _0, . . . , and Data9'_0.

First, the memory controller 100 outputs a command (not illustrated) for instructing to read the on DATA 0 from the memory cell array 260, to the memory chip 210. When the corresponding command is received from the memory controller 100, the memory chip 210 reads the on DATA 0 from the memory cell array 260. The on DATA 0 read from the memory cell array 260 is stored in the fourth buffer memory of the second toggle encoder 440.

When the memory controller 100 recognizes via a ready/busy signal (not illustrated) that the on DATA 0 is stored in the fourth buffer memory, the memory controller 100 instructs the memory chip 210 to output the enc DATA 0 as a signal DQ[0] by using signals RE and REn. Here, the memory I/F 150 sets the number indicated by the signals RE and REn, as the number corresponding to the fourth bit length, that is, 10.

As indicated by 910 of FIG. 11, the on DATA 0 that is the third data 740 with the 9-bit length stored in the fourth buffer memory is encoded into the enc DATA 0 that is the fourth data 760 with the 10-bit length, by the second toggle encoder 440_0. The enc DATA 0 is transmitted by the signal DQ[0].

Likewise, on DATA 1 that is the third data 740 with the 9-bit length is read from the memory cell array 260, and encoded into enc DATA 1 that is the fourth data 760 with the 10-bit length, by the second toggle encoder 440_1. The enc DATA 1 is transmitted by a signal DQ[1].

ori DATA 2 that is the third data 740 with the 9-bit length is read from the memory cell array 260, and encoded into enc DATA 2 that is the fourth data 760 with the 10-bit length, by the second toggle encoder 440_2. The enc DATA 2 is transmitted by a signal DQ[2].

ori DATA 3 that is the third data 740 with the 9-bit length is read from the memory cell array 260, and encoded into enc DATA 3 that is the fourth data 760 with the 10-bit length, by the second toggle encoder 440_3. The enc DATA 3 is transmitted by a signal DQ[3].

ori DATA 4 that is the third data 740 with the 9-bit length is read from the memory cell array 260, and encoded into enc DATA 4 that is the fourth data 760 with the 10-bit length, by the second toggle encoder 440_4. The enc DATA 4 is transmitted by a signal DQ[4].

ori DATA 5 that is the third data 740 with the 9-bit length is read from the memory cell array 260, and encoded into enc DATA 5 that is the fourth data 760 with the 10-bit length, by the second toggle encoder 440_5. The enc DATA 5 is transmitted by a signal DQ[5].

ori DATA 6 that is the third data 740 with the 9-bit length is read from the memory cell array 260, and encoded into enc DATA 6 that is the fourth data 760 with the 10-bit length, by the second toggle encoder 440_6. The enc DATA 6 is transmitted by a signal DQ[6].

ori DATA 7 that is the third data 740 with the 9-bit length is read from the memory cell array 260, and encoded into enc DATA 7 that is the fourth data 760 with the 10-bit length, by the second toggle encoder 440_7. The enc DATA 7 is transmitted by a signal DQ[7].

The memory chip 210 generates signals DQS and DQSn in response to the received signals RE and REn. The enc DATA 0 to the enc DATA 7 are received by the memory controller 100 in synchronization with timings indicated by the generated signals DQS and DQSn. More specifically, the enc DATA 0 to the enc DATA 7 are stored in the fifth buffer memory of the second toggle decoder 460.

As indicated by 930 of FIG. 12, the enc DATA 0 that is the fourth data 760 with the 10-bit length stored in the fifth buffer memory is decoded into the on DATA 0 that is the third data 740 with the 9-bit length, by the second toggle decoder 460_0.

Likewise, the enc DATA 1 that is the fourth data 760 with the 10-bit length is decoded into the on DATA 1 that is the third data 740 with the 9-bit length, by the second toggle decoder 460_1.

The enc DATA 2 that is the fourth data 760 with the 10-bit length is decoded into the on DATA 2 that is the third data 740 with the 9-bit length, by the second toggle decoder 460_2.

The enc DATA 3 that is the fourth data 760 with the 10-bit length is decoded into the on DATA 3 that is the third data 740 with the 9-bit length, by the second toggle decoder 460_3.

The enc DATA 4 that is the fourth data 760 with the 10-bit length is decoded into the on DATA 4 that is the third data 740 with the 9-bit length, by the second toggle decoder 460_4.

The enc DATA 5 that is the fourth data 760 with the 10-bit length is decoded into the on DATA 5 that is the third data 740 with the 9-bit length, by the second toggle decoder 460_5.

The enc DATA 6 that is the fourth data 760 with the 10-bit length is decoded into the on DATA 6 that is the third data 740 with the 9-bit length, by the second toggle decoder 460_6.

The enc DATA 7 that is the fourth data 760 with the 10-bit length is decoded into the on DATA 7 that is the third data 740 with the 9-bit length, by the second toggle decoder 460_7.

The on DATA 0 to on DATA 7 are stored in the first buffer memory 140 by the memory I/F 150.

In this manner, the memory controller 100 is capable of reading data from the memory chip 210.

In the memory system 1000 according to the first embodiment, after data is encoded such that the number of toggles of the data is decreased, data transmission is performed between the memory controller 100 and the non-volatile memory 200. Thus, it is possible to reduce power consumption accompanied by data transmission.

Further, in the memory system 1000 according to the first embodiment, since synchronous signals notifying about a timing of receiving encoded data are transmitted in accordance with a bit length of the encoded data, it is possible to stably perform transmission/reception of the data even when the number of toggles of the data is reduced.

Second Embodiment

A memory system 2000 according to a second embodiment has the same configuration as the memory system 1000 according to the first embodiment, except that the memory system 2000 does not include the first toggle decoder 420 and the second toggle encoder 440.

Figure 13:
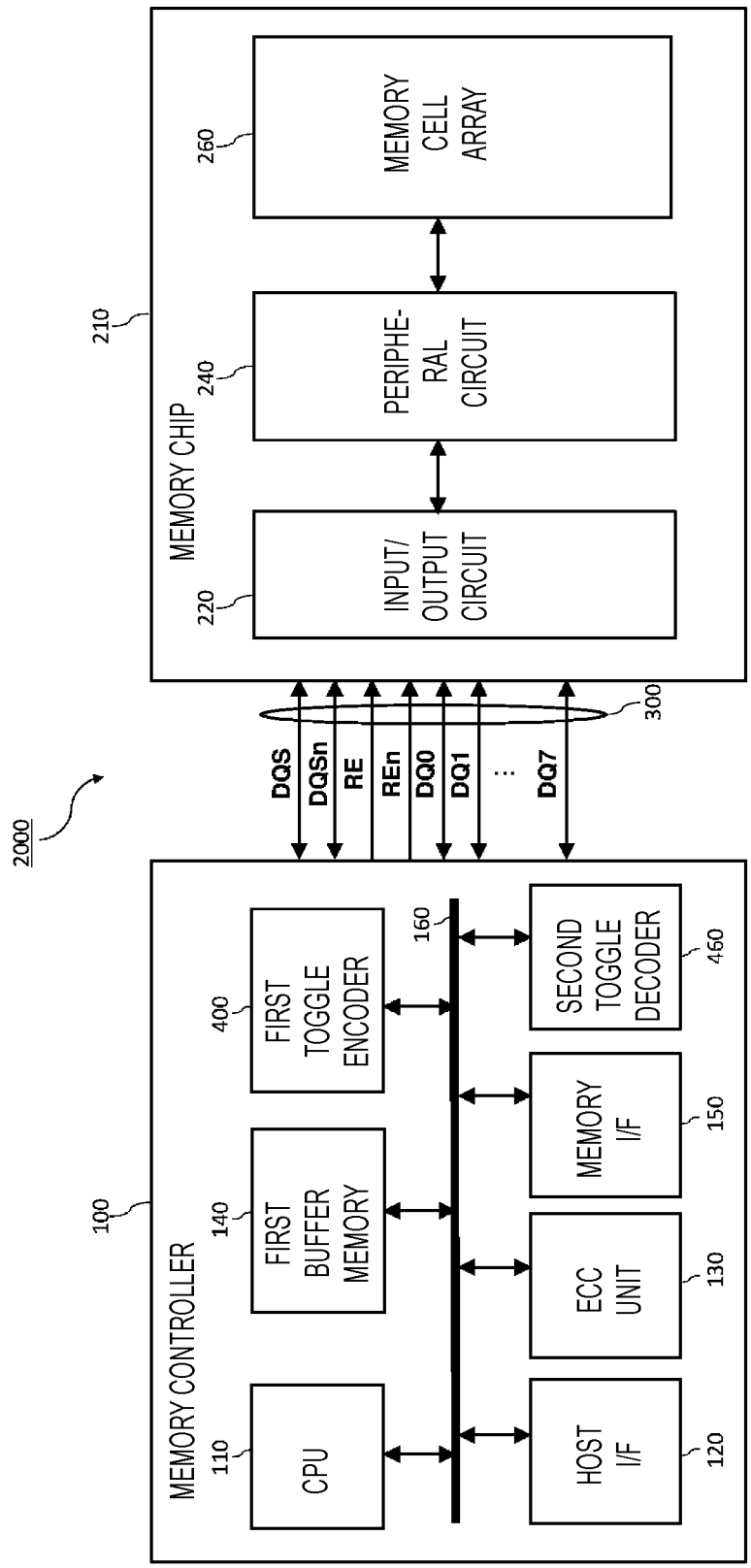
FIG. 13 is a block diagram illustrating an example of a configuration of a memory controller and a memory chip of a memory system according to a second embodiment.

FIG. 13 is a block diagram illustrating an example of a configuration of the memory controller 100 and the memory chip 210 of the memory system 2000 according to the second embodiment.

At the time of writing data, first data 700 stored in the second buffer memory of the first toggle encoder 400 is encoded into second data 720 by the first toggle encoder 400. Then, the second data 720 is transmitted to the memory chip 210 via the memory bus 300 by the memory I/F 150. The second data 720 transmitted to the memory chip 210 is written to the memory cell array 260.

At the time of reading data, fourth data 760 read from the memory cell array 260 is transmitted to the memory controller 100 via the memory bus 300. In particular, when the second data 720 is written to the memory cell array 260, and the second data 720 is correctly readable as the fourth data 760, the bit length and the number of toggles of the second data 720 are the same as those of the fourth data 760.

The fourth data 760 transmitted to the memory controller 100 is decoded into the third data 740 by the second toggle decoder 460. In particular, when the second data 720 is written to the memory cell array 260, and the second data 720 is correctly readable as the fourth data 760, the bit length and the number of toggles of the first data 700 are the same as those of the third data 740.

In the memory system 2000 according to the second embodiment, after data is encoded such that the number of toggles of the data is decreased, data transmission is performed between the memory controller 100 and the non-volatile memory 200. Thus, it is possible to reduce power consumption accompanied by data transmission.

The memory system 2000 according to the second embodiment does not include the first toggle decoder 420 and the second toggle encoder 440. Thus, there is no need to change the size of the memory chip 210 as compared to the example of the related art, and thus, it is possible to reduce the cost of the memory chip 210.

Third Embodiment

A memory system 3000 according to a third embodiment has the same configuration as the memory system 1000 according to the first embodiment, except that the memory system 3000 includes an interface (I/F) chip 500.

Figure 14:
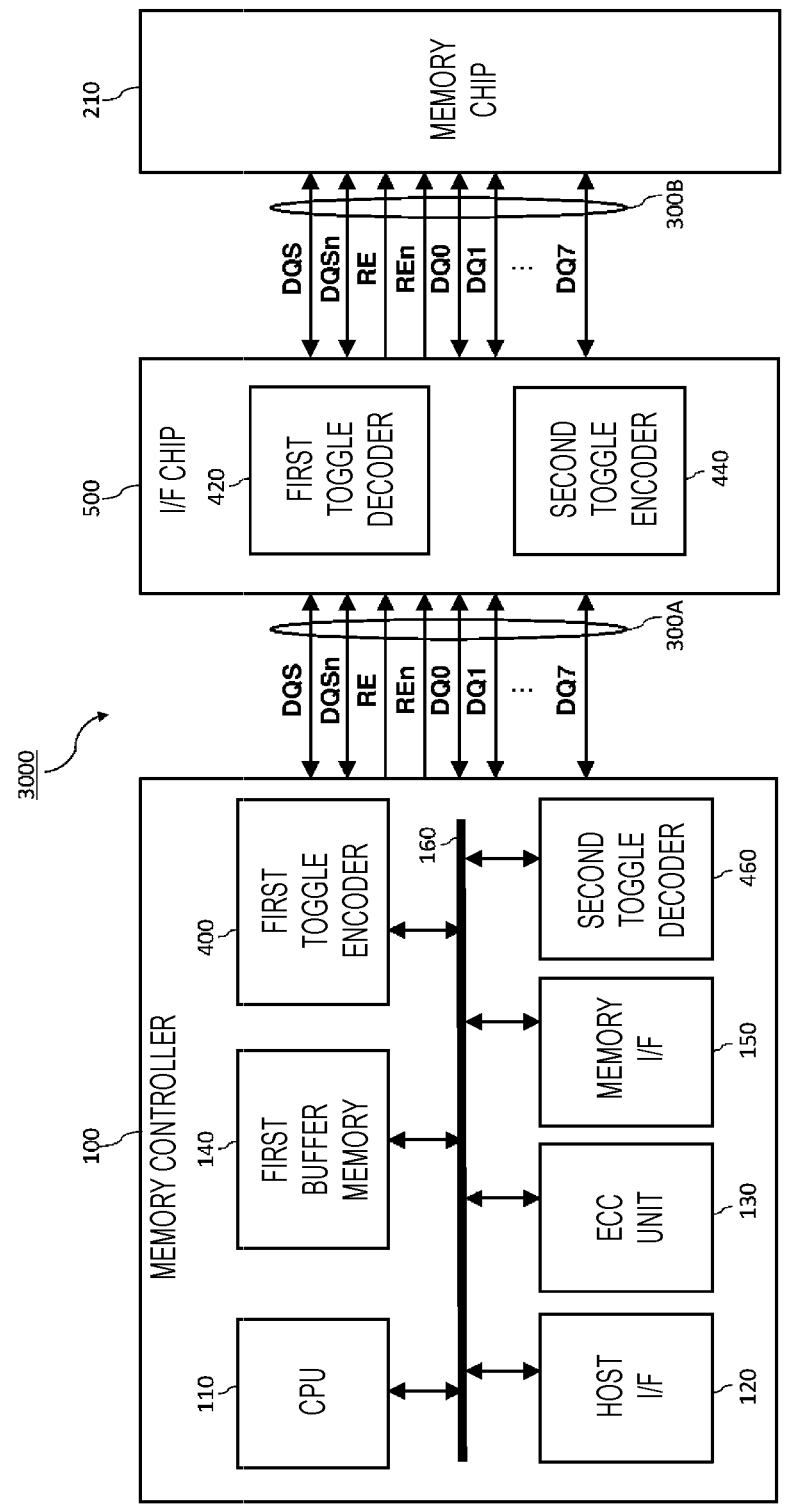
FIG. 14 is a block diagram illustrating an example of a configuration of a memory controller, an interface chip, and a memory chip of a memory system according to a third embodiment.

FIG. 14 is a block diagram illustrating an example of a configuration of the memory controller 100, the I/F chip 500, and the memory chip 210 of the memory system 3000 according to the third embodiment.

As illustrated in FIG. 14, the I/F chip 500 includes the first toggle decoder 420 and the second toggle encoder 440. In the third embodiment, descriptions are given for a case where the I/F chip 500 includes the first toggle decoder 420 and the second toggle encoder 440. However, one of the first toggle decoder 420 and the second toggle encoder 440 may be present outside the I/F chip 500, and the other may be present inside the I/F chip 500.

At the time of writing data, the I/F chip 500 receives second data 720 from the memory controller 100 via a memory bus 300A. The received second data 720 is decoded into first data 700 by the first toggle decoder 420. Then, the I/F chip 500 transmits the first data 700 to the memory chip 210 via a memory bus 300B.

The memory bus 300A transmits/receives, for example, signals DQ, DQS, DQSn, RE, and REn from/to the memory controller 100 and the I/F chip 500. The memory bus 300B transmits/receives, for example, signals DQ, DQS, DQSn, RE, and REn from/to the I/F chip 500 and the memory chip 210.

At the time of reading data, the I/F chip 500 receives third data 740 stored in cell transistors of the memory cell array 260, from the memory chip 210, via the memory bus 300B. The received third data 740 is encoded into fourth data 760 by the second toggle encoder 440. The bit length of the third data 740 may be the same as or different from that of the first data 700. The number of toggles of the third data 740 may be the same as or different from that of the first data 700. In particular, when the first data 700 is written to the memory cell array 260, and the first data 700 is correctly readable as the third data 740, the bit length and the number of toggles of the first data 700 are the same as those of the third data 740.

Further, the bit length of the fourth data 760 may be the same as or different from that of the second data 720. In addition, the number of toggles of the fourth data 760 may be the same as or different from that of the second data 720. In particular, when the first data 700 is written to the memory cell array 260, and the first data 700 is correctly readable as the third data 740, the bit length and the number of toggles of the second data 720 are the same as those of the fourth data 760.

The I/F chip 500 transmits the encoded fourth data 760 to the memory controller 100 via the memory bus 300A.

Figure 15A:
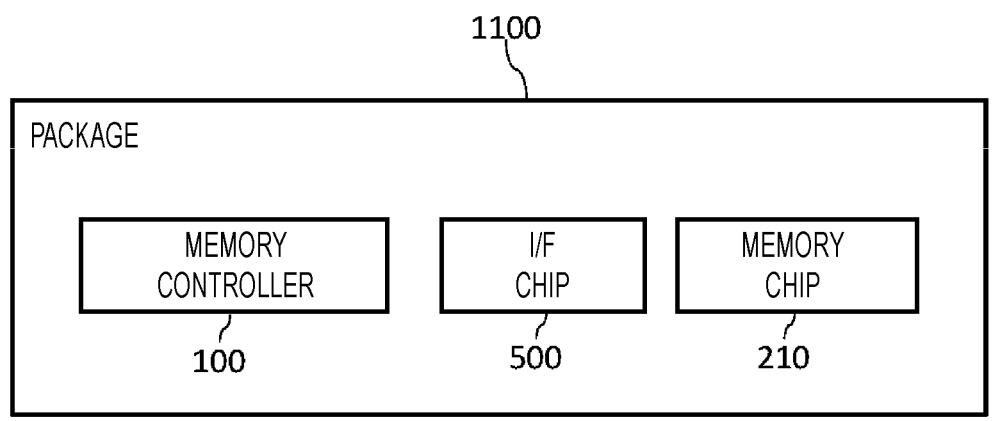
FIG. 15A is a block diagram illustrating an example of a configuration where the memory controller, the interface chip, and the memory chip are mounted in the same package in the memory system according to the third embodiment.

FIG. 15A is a block diagram illustrating an example of a configuration where the memory controller 100, the I/F chip 500, and the memory chip 210 are mounted in the same package 1100 in the memory system 3000 according to the third embodiment.

Figure 15B:
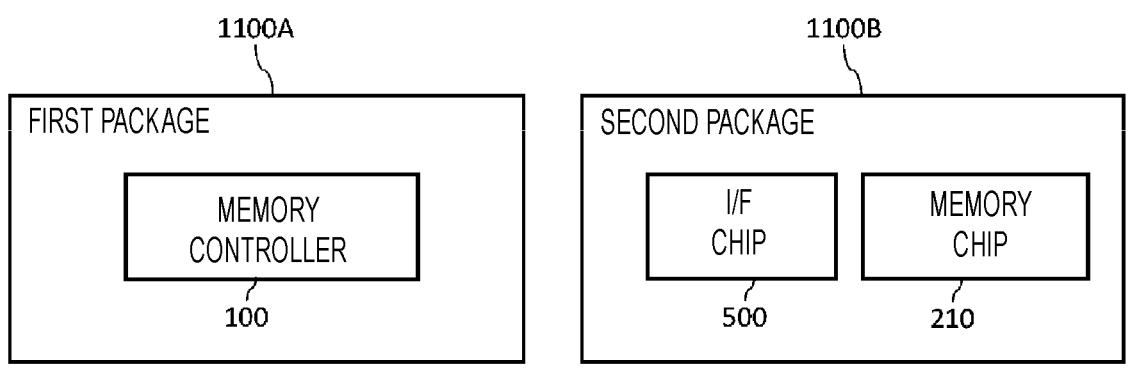
FIG. 15B is a block diagram illustrating an example of a configuration where the interface chip is mounted together with the memory chip in a second package independent of a first package where the memory controller is mounted, in the memory system according to the third embodiment.

FIG. 15B is a block diagram illustrating an example of a configuration where the I/F chip 500 is mounted together with the memory chip 210 in a second package 1100B independent of a first package 1100A where the memory controller 100 is mounted, in the memory system 3000 according to the third embodiment.

Figure 15C:
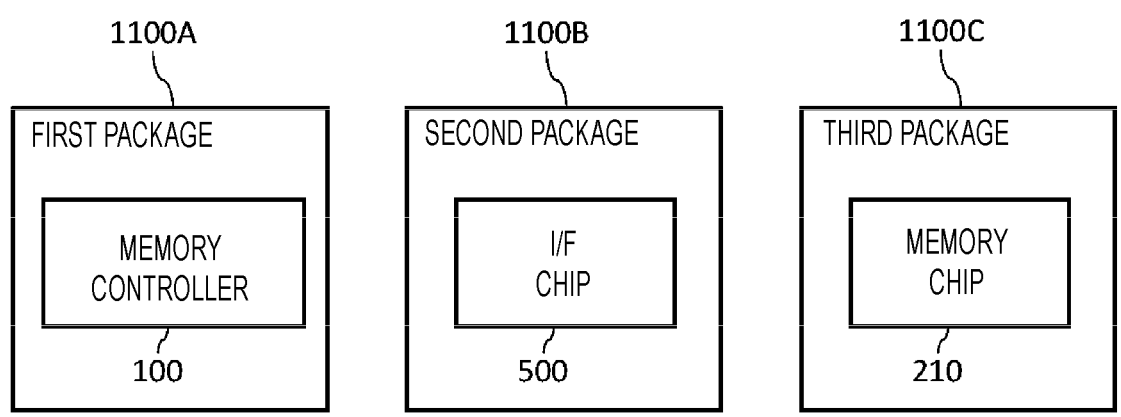
FIG. 15C is a block diagram illustrating an example of a configuration where the memory controller, the interface chip, and the memory chip are mounted in different packages, respectively, in the memory system according to the third embodiment.

FIG. 15C is a block diagram illustrating an example of a configuration where the memory controller 100, the I/F chip 500, and the memory chip 210 are mounted in different packages 1100, respectively, in the memory system 3000 according to the third embodiment.

As illustrated in FIGS. 15A to 15C, the I/F chip 500 and the memory chip 210 may be present in the same package, or may be present in different packages. The I/F chip 500 and the memory chip 210 may be integrated in the same chip. In this case, the I/F chip 500 and the memory chip 210 may be manufactured using the same process, or may be manufactured using different processes. In addition, the I/F chip 500 and the memory chip 210 may be aligned in the horizontal direction, or may be aligned in the vertical direction, with respect to a semiconductor substrate. In addition, a plurality of memory chips 210 may be mounted in one package.

Figure 16A:
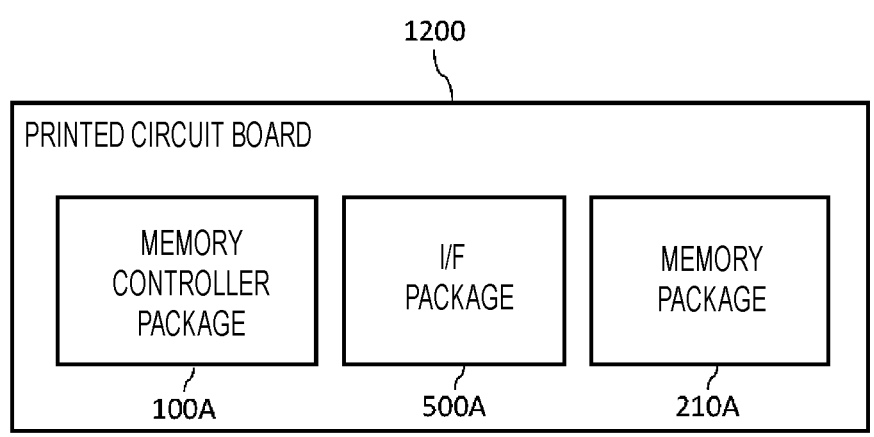
FIG. 16A is a block diagram illustrating an example of a configuration where a memory controller package, an interface package, and a memory package are mounted on the same printed circuit board, in the memory system according to the third embodiment.

FIG. 16A is a block diagram illustrating an example of a configuration where a memory controller package 100A, an interface package 500A, and a memory package 210A are mounted on the same printed circuit board 1200, in the memory system 3000 according to the third embodiment.

Figure 16B:
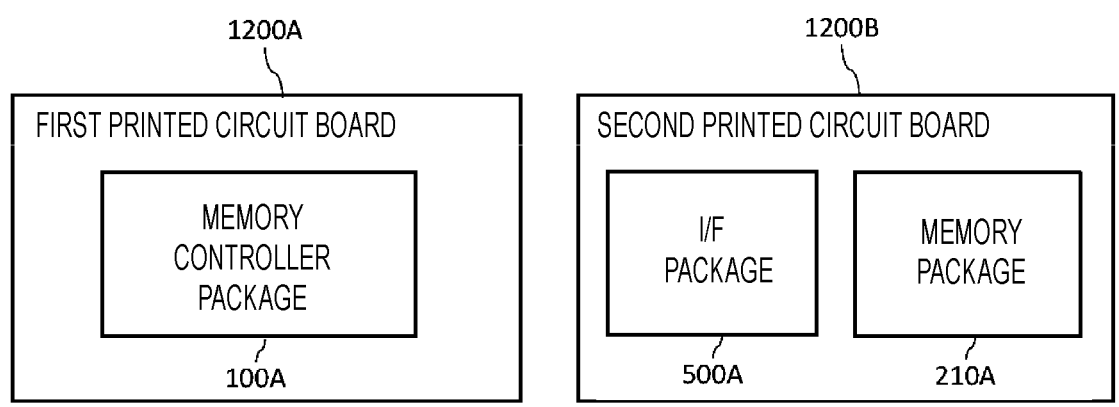
FIG. 16B is a block diagram illustrating an example of a configuration where the interface package is mounted together with the memory package on a second printed circuit board independent of a first printed circuit board on which the memory controller package is mounted, in the memory system according to the third embodiment.

FIG. 16B is a block diagram illustrating an example of a configuration where the interface package 500A is mounted together with the memory package 210A on a second printed circuit board 1200B independent of a first printed circuit board 1200A on which the memory controller package 100A is mounted, in the memory system 3000 according to the third embodiment.

The memory controller package 100A is a package in which the memory controller 100 is provided. The memory package 210A is a package in which the memory chip 210 is provided. The interface package 500A is a package in which the I/F chip 500 is provided.

As illustrated in FIGS. 16A and 16B, the interface package 500A and the memory package 210A may be mounted in the same package, or may be mounted in different packages.

In the memory system 3000 according to the third embodiment, after encoding is performed such that the number of toggles of data is decreased, data transmission is performed between the memory controller 100 and the I/F chip 500. Thus, it is possible to reduce power consumption accompanied by data transmission.

Further, in the memory system 3000 according to the third embodiment, the memory chip 210 does not include the first toggle decoder 420 and the second toggle encoder 440. Thus, there is no need to change the size of the memory chip 210 as compared to the example of the related art, and thus, it is possible to reduce the cost of the memory chip 210.

Fourth Embodiment

A memory system 4000 according to a fourth embodiment has the same configuration as the memory system 1000 according to the first embodiment, except that the memory controller 100 in the memory system 4000 includes a randomizer 600.

Figure 17:
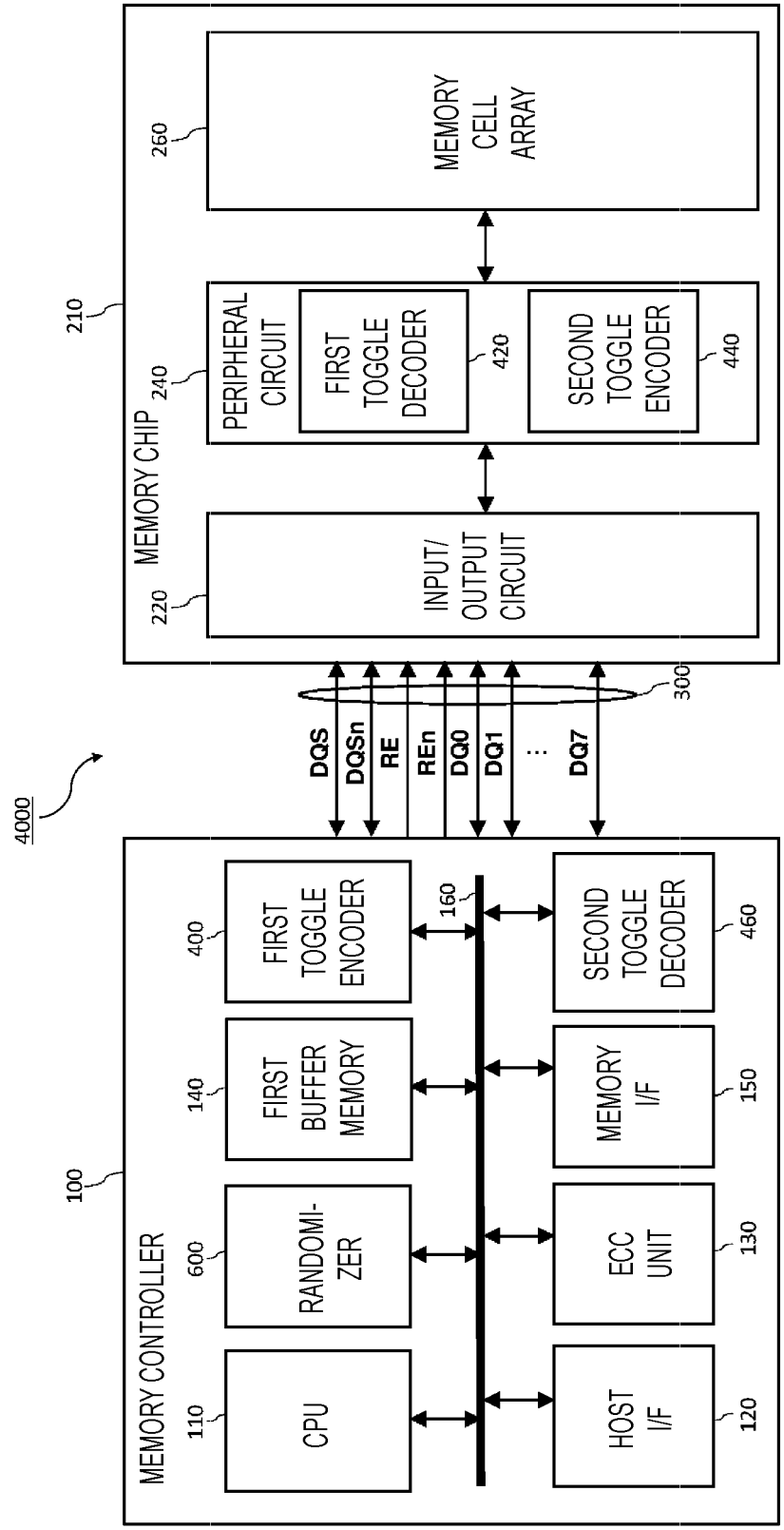
FIG. 17 is a block diagram illustrating an example of a configuration of a memory controller including a randomizer, and a memory chip, in a memory system according to a fourth embodiment.

FIG. 17 is a block diagram illustrating an example of a configuration of the memory controller 100 including the randomizer 600 and the memory chip 210, in the memory system 4000 according to the fourth embodiment.

Write data, etc. received from the first buffer memory 140 is transmitted as fifth data having a first bit length to the randomizer 600 by the memory I/F 150. The randomizer 600 randomizes the fifth data having the first bit length to generate first data 700. The randomized first data 700 is encoded into second data 720 by the first toggle encoder 400. Then, the second data 720 is transmitted to the non-volatile memory 200.

In addition, third data 740 received from the memory cell array 260 is transmitted to the second toggle encoder 440 by the peripheral circuit 240. The third data 740 is encoded into fourth data 760 by the second toggle encoder 440. The fourth data 760 is transmitted to the memory controller 100. The fourth data 760 is decoded into the third data 740 by the second toggle decoder 460. Next, the third data 740 is transmitted to the randomizer 600. The randomizer 600 de-randomizes the third data 740 to generate the fifth data having the first bit length.

In addition, the bit length of the third data 740 may be the same as or different from that of the first data 700. In addition, the number of toggles of the third data 740 may be the same as or different from that of the first data 700. In particular, when the first data 700 is written to the memory cell array 260, and the first data 700 is correctly readable as the third data 740, the bit length and the number of toggles of the first data 700 are the same as those of the third data 740.

Further, the bit length of the fourth data 760 may be the same as or different from that of the second data 720. The number of toggles of the fourth data 760 may be the same as or different from that of the second data 720. In particular, when the first data 700 is written to the memory cell array 260, and the first data 700 is correctly readable as the third data 740, the bit length and the number of toggles of the second data 720 are the same as those of the fourth data 760.

In the memory system 4000 according to the fourth embodiment, after encoding is performed such that the number of toggles of data is decreased, data transmission is performed between the memory controller 100 and the non-volatile memory 200. Thus, it is possible to reduce power consumption accompanied by data transmission.

In the present embodiment, it is expected that the first data pieces 700 in the first data group equally appear. Therefore, in the present embodiment, as described above with reference to FIGS. 5A to 5H, a conversion may be performed such that an average of the numbers of toggles of the second data pieces 720 in the second data group is smaller than an average of the numbers of toggles of the first data pieces 700 in the first data group. Then, it is possible to reduce power consumption accompanied by data transmission without necessarily reducing the number of toggles of each first data piece in the first data group.

Meanwhile, when the first data pieces 700 in the first data group do not equally appear, the numbers of toggles of the first data pieces 700 are weighted by the appearance frequency, and these sums are compared to each other so that the number of toggles may be reduced. For example, in a case where data "010010000" appears more frequently than other data, when the data "010010000" is encoded, encoding is performed such that the number of toggles is smaller than those of other data having a low appearance frequency.

Fifth Embodiment

A memory system 5000 according to a fifth embodiment has the same configuration as the memory system 1000 according to the first embodiment, except that the non-volatile memory 200 in the memory system 5000 includes the randomizer 600. The randomizer 600 randomizes data to be written in order to improve the reliability of read data.

Figure 18:
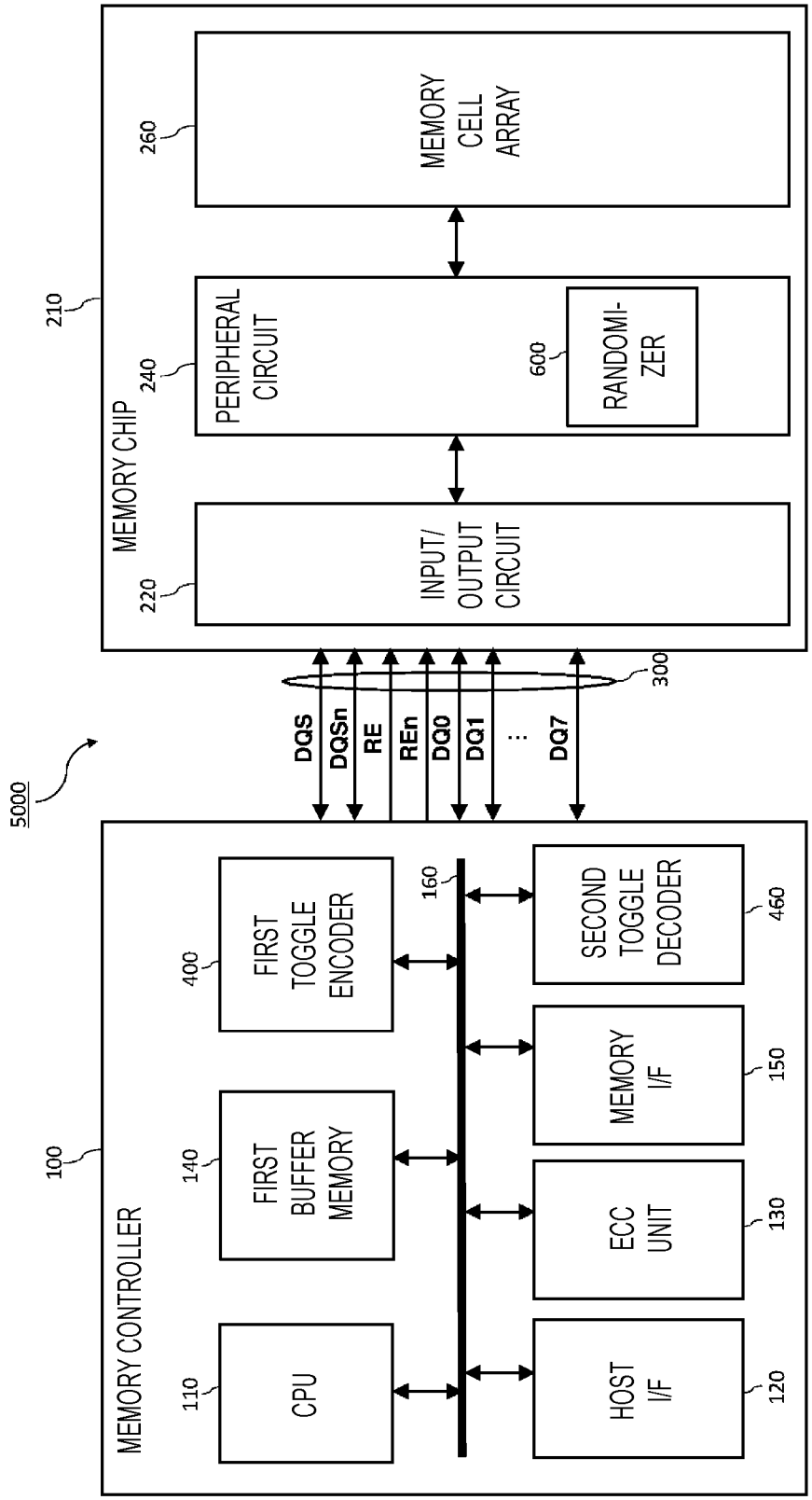
FIG. 18 is a block diagram illustrating an example of a configuration of a memory controller and a memory chip including a randomizer, in a memory system according to a fifth embodiment.

FIG. 18 is a block diagram illustrating an example of a configuration of the memory controller 100 and the memory chip 210 including the randomizer 600, in the memory system 5000 according to the fifth embodiment.

At the time of writing data, first data 700 stored in the second buffer memory of the first toggle encoder 400 is encoded into second data 720 by the first toggle encoder 400. Then, the second data 720 is transmitted to the memory chip 210 by the memory I/F 150 via the memory bus 300.

The second data 720 transmitted to the memory chip 210 is randomized into fifth data having the second bit length by the randomizer 600. The randomized fifth data is written to the memory cell array 260.

At the time of reading data, sixth data read from the memory cell array 260 is de-randomized by the randomizer 600 and becomes fourth data having the fourth bit length, and the fourth number of toggles. The de-randomized fourth data is transmitted to the memory controller 100 via the memory bus 300. The fourth data transmitted to the memory controller 100 is decoded into third data having the third bit length shorter than the fourth bit length and the third number of toggles larger than the fourth number of toggles by the second toggle decoder 460.

In addition, the bit length of the fourth data 760 may be the same as or different from that of the second data 720. The number of toggles of the fourth data 760 may be the same as or different from that of the second data 720. In particular, when the fifth data is written to the memory cell array 260, and the fifth data is correctly readable as the sixth data, the bit length and the number of toggles of the second data 720 are the same as those of the fourth data 760.

In addition, the bit length of the third data 740 may be the same as or different from that of the first data 700. In addition, the number of toggles of the third data 740 may be the same as or different from that of the first data 700. In particular, when the fifth data is written to the memory cell array 260, and the fifth data is correctly readable as the sixth data, the bit length and the number of toggles of the first data 700 are the same as those of the third data 740.

Further, the bit length of the sixth data may be the same as or different from that of the fifth data. In addition, the number of toggles of the sixth data may be the same as or different from that of the fifth data. In particular, when the fifth data is written to the memory cell array 260, and the fifth data is correctly readable as the sixth data, the bit length and the number of toggles of the fifth data are the same as those of the sixth data.

In the memory system 5000 according to the fifth embodiment, after encoding is performed such that the number of toggles of data is decreased, data transmission is performed between the memory controller 100 and the non-volatile memory 200. Thus, it is possible to reduce power consumption accompanied by data transmission. Further, since the non-volatile memory 200 includes the randomizer 600, it is possible to maintain the reliability of the memory system 5000.

In the memory system according to at least one of the above described embodiments, after encoding is performed such that the number of toggles of data is decreased, data transmission is performed between the memory controller and the non-volatile memory. Thus, it is possible to reduce power consumption accompanied by data transmission.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A memory system comprising:
    a non-volatile memory; and
    a controller that includes a first toggle encoder configured to encode first data having a first bit length and a first number of toggles, into second data having a second bit length longer than the first bit length and a second number of toggles smaller than the first number of toggles, and transmit the second data to the non-volatile memory.

2. The memory system according to claim 1, wherein the controller is configured to transmit a first synchronous signal notifying the non-volatile memory of a timing for receiving the second data, to the non-volatile memory.

3. The memory system according to claim 2, wherein the number of times the first synchronous signal is transmitted corresponds to the second bit length.

4. The memory system according to claim 3, wherein the non-volatile memory includes a first toggle decoder configured to decode the second data into the first data, and a memory cell array in which the first data is stored.

5. The memory system according to claim 4, wherein the non-volatile memory further includes a second toggle encoder configured to encode third data read from the memory cell array into fourth data, the third data having a third bit length and a third number of toggles and the fourth data having a fourth bit length longer than the third bit length and a fourth number of toggles smaller than the third number of toggles.

6. The memory system according to claim 5, wherein the non-volatile memory is configured to transmit a second synchronous signal notifying the controller of a timing for receiving the fourth data, to the controller.

7. The memory system according to claim 6, wherein the number of times the second synchronous signal is transmitted corresponds to the fourth bit length.

8. The memory system according to claim 5, wherein the controller is configured to transmit an instruction signal that instructs the non-volatile memory to output the fourth data, to the non-volatile memory.

9. The memory system according to claim 8, wherein the number of times the instruction signal is transmitted corresponds to the fourth bit length.

10. The memory system according to claim 8, wherein the non-volatile memory is configured to generate a second synchronous signal notifying the controller of a timing for receiving the fourth data, in accordance with the instruction signal.

11. The memory system according to claim 5, wherein the fourth data is transmitted from the non-volatile memory to the controller and the controller includes a second toggle decoder configured to decode the fourth data into the third data.

12. The memory system according to claim 11, wherein bit lengths of the second data and the fourth data are the same.

13. The memory system according to claim 1, further comprising:
an interface chip connected between the non-volatile memory and the controller and including a first toggle decoder configured to decode the second data transmitted by the controller and transmit the decoded second data to the non-volatile memory.

14. The memory system according to claim 13, wherein data values of the decoded second data and the first data are the same.

15. The memory system according to claim 14, wherein the interface chip further includes a second toggle encoder configured to encode third data received from the non-volatile memory into fourth data and transmit the fourth data to the controller, the third data having a third bit length and a third number of toggles and the fourth data having a fourth bit length longer than the third bit length and a fourth number of toggles smaller than the third number of toggles.

16. The memory system according to claim 1, further comprising a randomizer configured to randomize the second data before the second data is transmitted to the non-volatile memory.

17. The memory system according to claim 1, wherein the non-volatile memory includes a randomizer configured to randomize the second data, and a memory cell array to which the randomized second data is written.

18. The memory system according to claim 1, wherein the first toggle encoder is further configured to encode any data having the first bit length into encoded data having the second bit length, such that a number of toggles in said any data is less than or equal to a number of toggles in said encoded data.

19. The memory system according to claim 1, wherein the first toggle encoder is further configured to encode any data having the first bit length into encoded data having the second bit length, such that an average number of toggles in a group of said any data is greater than an average number of toggles in a corresponding group of said encoded data.

20. A memory system comprising:
a non-volatile memory; and
a controller that includes
a toggle encoder configured to encode first data having a first bit length and a first number of toggles, into second data having a second bit length longer than the first bit length and a second number of toggles smaller than the first number of toggles, and transmit the second data to the non-volatile memory, and
a toggle decoder configured to decode third data received from the non-volatile memory into fourth data, the third data having the second bit length and the second number of toggles and the fourth data having the first bit length and the first number of toggles.

* * * * *